US009589048B2

(12) United States Patent
Milton et al.

(10) Patent No.: US 9,589,048 B2
(45) Date of Patent: Mar. 7, 2017

(54) GEOLOCATION DATA ANALYTICS ON MULTI-GROUP POPULATIONS OF USER COMPUTING DEVICES

(71) Applicant: PlaceIQ, Inc., New York, NY (US)

(72) Inventors: Stephen Milton, Lyons, CO (US); Duncan McCall, Greenwhich, CT (US)

(73) Assignee: PlaceIQ, Inc., New York, NY (US)

( * ) Notice: Subject to any disclaimer, the term of this patent is extended or adjusted under 35 U.S.C. 154(b) by 0 days.

(21) Appl. No.: 15/075,179

(22) Filed: Mar. 20, 2016

(65) Prior Publication Data

US 2016/0203211 A1 Jul. 14, 2016

Related U.S. Application Data

(63) Continuation-in-part of application No. 14/334,066, filed on Jul. 17, 2014, and a continuation-in-part of application No. 14/667,371, filed on Mar. 24, 2015, application No. 15/075,179, which is a continuation-in-part of application No. 13/769,736, filed on Feb. 18, 2013.

(60) Provisional application No. 62/135,916, filed on Mar. 20, 2015, provisional application No. 62/156,674, filed on May 4, 2015, provisional application No.
(Continued)

(51) Int. Cl.
G06F 17/30 (2006.01)
G06Q 30/02 (2012.01)
H04L 12/58 (2006.01)

(52) U.S. Cl.
CPC .. *G06F 17/30598* (2013.01); *G06F 17/30241* (2013.01); *G06Q 30/0261* (2013.01); *G06Q 30/0269* (2013.01); *H04L 51/20* (2013.01)

(58) Field of Classification Search
None
See application file for complete search history.

(56) References Cited

U.S. PATENT DOCUMENTS

| 2007/0005419 | A1 | 1/2007 | Horvitz et al. |
| 2011/0093340 | A1 | 4/2011 | Kramer et al. |
| 2013/0054335 | A1 | 2/2013 | Kjelsbak et al. |

(Continued)

OTHER PUBLICATIONS

Controlled experiments on the web: Survey and Practical Guide, Springer Science+Business Media, LLC, Feb. 14, 2008 pp. 140 to 181.

(Continued)

*Primary Examiner* — Jay Morrison
(74) *Attorney, Agent, or Firm* — Pillsbury Winthrop Shaw Pittman LLP

(57) ABSTRACT

Provided is a process including: obtaining device identifiers of a population of user computing devices; obtaining groups of the users computing devices obtaining one or more places of interest; assigning user computing devices to either a treatment collection xor a control collection based on hash values of the device identifiers; directing application of the treatment according to the assignment; obtaining geolocations visited by the user computing devices; assigning the geolocations to either the treatment collection xor the control collection based on hash values of device identifiers associated with the geolocations; assigning the geolocations to one or more of the groups based on the device identifiers associated with the geolocations; and for each group, determining a respective amount of visits to at least some of the one or more places of interest attributable to the treatment based on the geolocation assignments.

20 Claims, 5 Drawing Sheets

Related U.S. Application Data

62/244,767, filed on Oct. 22, 2015, provisional application No. 61/969,661, filed on Mar. 24, 2014.

(56) References Cited

U.S. PATENT DOCUMENTS

| | | | |
|---|---|---|---|
| 2014/0045534 | A1 | 2/2014 | Mahaffey et al. |
| 2014/0114748 | A1 | 4/2014 | Bruich |
| 2014/0236669 | A1 | 8/2014 | Milton et al. |
| 2014/0236706 | A1 | 8/2014 | Opie et al. |
| 2015/0011320 | A1 | 1/2015 | Ocko et al. |
| 2015/0058077 | A1 | 2/2015 | Buban et al. |
| 2015/0113540 | A1 | 4/2015 | Rabinovici et al. |
| 2015/0134532 | A1 | 5/2015 | Bernard et al. |
| 2015/0142551 | A1 | 5/2015 | Papakipos et al. |
| 2016/0026640 | A1 | 1/2016 | Hart et al. |
| 2016/0034468 | A1 | 2/2016 | Hart et al. |
| 2016/0055320 | A1 | 2/2016 | Wang et al. |
| 2016/0066189 | A1 | 3/2016 | Mahaffey et al. |

OTHER PUBLICATIONS

Estimating the Effect of Online Display Advertising on Browser Conversion, http://files.meetup.com/1542972/CausalKD-DWorkShopPaper.pdf, ADKDD '11, Aug. 21, 2011, pp. 1 to 9.
Generalized Louvain Method for Community Detection in Large Networks, http://arxiv.org/pdf11108.1502v2.pdf, Cornell University Library, De Meo et al., Aug. 6, 2011, pp. 1 to 6.
How Effective is Targeted Advertising?, http://uxscientist.com/public/docs/uxsci_47.pdf, WWW 2012—Session: Advertising on the Web 1, Apr. 16-20, 2012, Lyon, France, pp. 111 to 120.
How to build a scientific approach to customer marketing, https://gigaom.com/2013/10/12/how-to-build-a-scientific-approach-to-customer-marketing/, Gigaom, Oct. 12, 2013, pp. 1 to 8.
If You Want to Measure Incrementality, Do It Right, http://adexchanger.com/data-driven-thinking/if-you-want-to-measure-incrementality-do-it-right/, Ad Exchanger, Mar. 4, 2014, pp. 1 to 9.
Internet Advertising: An Interplay among Advertisers, Online Publishers, Ad Exchanges and Web Users, http://arxiv.org/abs/1206.1754, Cornell University Library, Yuan et al., Jul. 2, 2012, pp. 1 to 44.
A Density-Based Algorithm for Discovering Clusters in Large Spatial Databases with Noise, www.aaai.org/Papers/KDD/1996/KDD96-037.pdf , 2nd International Conference on Knowledge Discovery and Data Mining (KDD-1996), pp. 1 to 6.
Mobile Ad Effectiveness: Hyper-Contextual Targeting with Crowdedness, Andrews et al., Dec. 11, 2014, pp. 1 to 30.
Simpson's paradox, https://en.wikipedia.org/w/index.php?title=Simpson%27s_paradox&oldid=593370589, Feb. 1, 2014, pp. 1 to 6.
Standards Working Group, Federal Geographic Data Committee, United States National Grid, Dec. 2001, pp. 1 to 43.
The logic of Simpson's paradox, Springer Science+Business Media B.V. 2010, Bandyoapdhyay et al., Sep. 28, 2010, pp. 185 to 208.
Towards Efficient Translation Memory Search Based on Multiple Sentence Signatures, http://cdn.intechopen.com/pdfs-wm/16002.pdf, InTech, Jun. 21, 2011, pp. 1 to 15.

GEOLOCATION DATA ANALYTICS ON MULTI-GROUP POPULATIONS OF USER COMPUTING DEVICES

CROSS-REFERENCE TO RELATED APPLICATIONS

This patent claims the benefit of U.S. Provisional Patent Application 62/135,916, titled "LOCATION-BASED ANALYTIC PLATFORM AND METHODS," filed 20 Mar. 2015; claims the benefit of U.S. Provisional Patent Application 62/156,674, titled "ANALYZING CONSUMER BEHAVIOR BASED ON LOCATION VISITATION," filed 4 May 2015; claims the benefit of U.S. Provisional Patent Application 62/244,767, titled "BRANCHING MOBILE-DEVICE TO SYSTEM-NAMESPACE IDENTIFIER MAPPINGS," filed 22 Oct. 2015; is a continuation-in-part of U.S. patent application Ser. No. 14/334,066, titled "Matching Anonymized User Identifiers Across Differently Anonymized Data Sets," filed 17 Jul. 2014; is a continuation-in-part of U.S. patent application Ser. No. 14/667,371, titled "LOCATION-BASED ANALYTIC PLATFORM AND METHODS," filed 24 Mar. 2015, which claims the benefit of U.S. Provisional Patent Application 61/969,661, titled "LOCATION-BASED ANALYTIC PLATFORM AND METHODS," filed 24 Mar. 2014; and is a continuation-in-part of U.S. patent application Ser. No. 13/769,736, titled "Apparatus and Method for Identifying and Employing Visitation Rates," filed 18 Feb. 2013. The entire content of each of these earlier-filed applications is hereby incorporated by reference for all purposes.

BACKGROUND

1. Field

The present inventions relate generally to computer systems for large-scale data analytics and, more specifically, to computer systems for evaluating the effects of content distributed over networks on behaviors of groups sharing some attribute as indicated by network traffic.

2. Description of the Related Art

Geolocation analytics platforms are generally used to understand human behavior. Such systems map data about places to geographic locations and then this mapping is used to analyze patterns in human behavior based on people's presence in those geographic locations. For example, researchers may use such systems to understand patterns in health, educational, crime, or political outcomes in geographic areas. And some companies use such systems to understand the nature of their physical locations, analyzing, for instance, the demographics of customers who visit their stores, restaurants, or other facilities. Some companies use such systems to measure and understand the results of TV advertising campaigns, detecting changes in the types of customers who visit stores following a campaign. Some companies use geolocation analytics platforms to target content to geolocations, e.g., selecting content like business listings, advertisements, billboards, mailings, restaurant reviews, and the like, based on human behavior associated with locations to which the content is directed. In many contexts, location can be a useful indicator of human behavior.

Traditional geolocation analytics platforms are not well suited for performing complex analyses on large data sets, as often arise in the context of analyzing web-scale data sets describing user behavior on a network. In many cases, simplifying assumptions are made to render the analysis more tractable for available computers and software, but these assumptions can give rise to various biases and misleading results that can skew the results of analyses.

One noteworthy example of such a misleading result is Simpson's paradox, where an analysis may reveal a particular effect in a population, but when the analysis is repeated for groups within that population, the effect can disappear or even reverse. In some cases, the group-to-group variation overwhelms the effect caused by a treatment, making the effects of the treatment on the various groups appear different from what is actually happening.

Yet it is common to ignore this issue and other sources of bias because, particularly for stochastic analyses of large data sets that reveal themselves over time, it can be difficult to consistently and reliably disaggregate control and treatment segments of the population. The difficultly is compounded when members of groups at issue have intersecting sets of members, when the number of groups is relatively large, and when the members of the population appear inconsistently over time. Further challenges arise from efforts to avoid selection bias, as often happens when users' behaviors on networks makes certain groups more likely to be represented in a sample.

SUMMARY

The following is a non-exhaustive listing of some aspects of the present techniques. These and other aspects are described in the following disclosure.

Some aspects include a process including: obtaining device identifiers of a population of user computing devices; obtaining groups of the users computing devices obtaining one or more places of interest; assigning user computing devices to either a treatment collection xor a control collection based on hash values of the device identifiers; directing application of the treatment according to the assignment; obtaining geolocations visited by the user computing devices; assigning the geolocations to either the treatment collection xor the control collection based on hash values of device identifiers associated with the geolocations; assigning the geolocations to one or more of the groups based on the device identifiers associated with the geolocations; and for each group, determining a respective amount of visits to at least some of the one or more places of interest attributable to the treatment based on the geolocation assignments.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
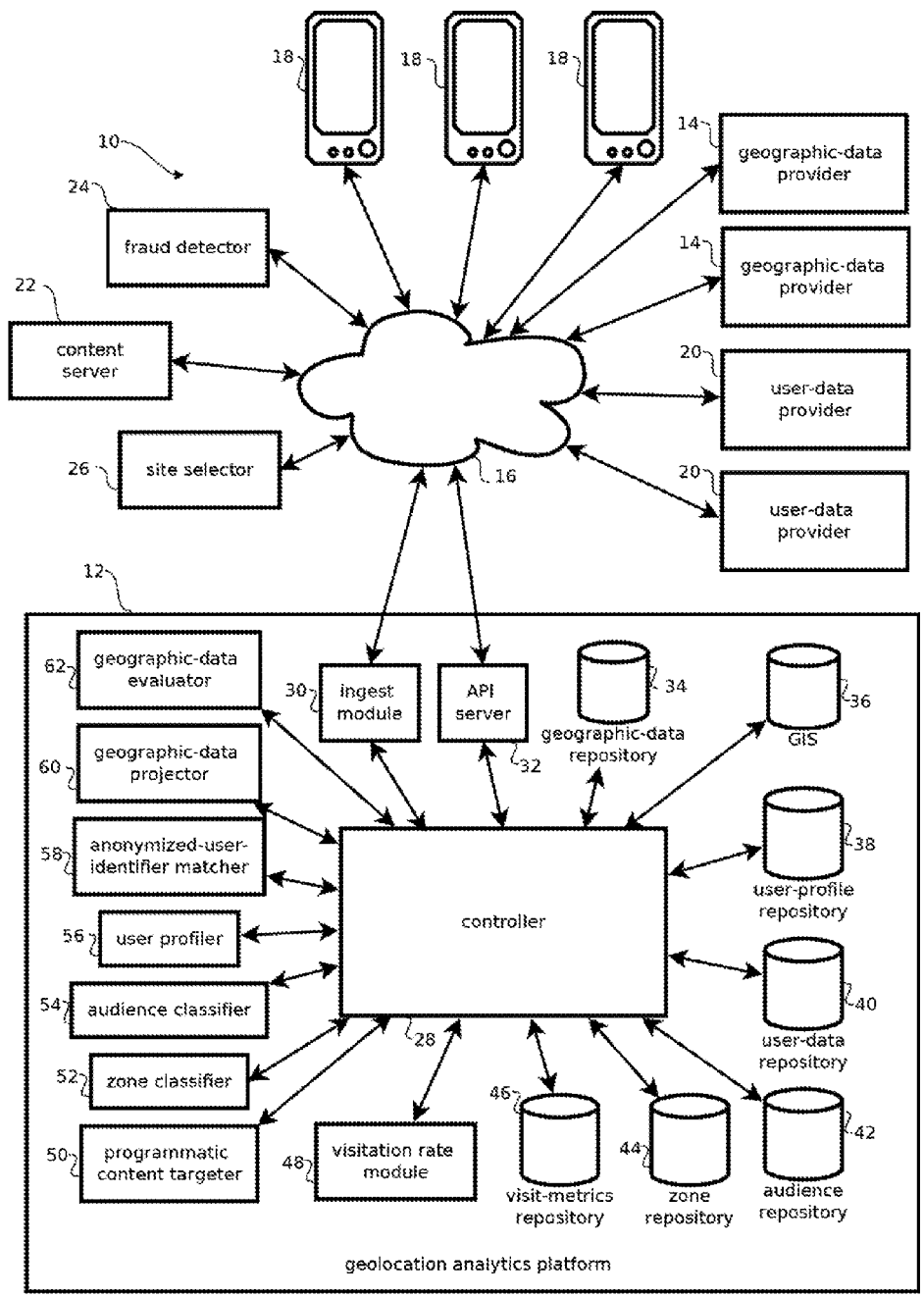
FIG. 1 shows an example of a computing environment having a location analytics platform consistent with the present techniques.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of geolocation data analytics. Indeed, the inventors wish to emphasize the difficulty of recognizing those problems that are nascent and will become much more apparent in the future should trends in industry continue as the inventors expect. The inventors also wish to emphasize that certain techniques described below required insights that span multiple disciplines that often do not interact, including data analytics, computer science, and cryptography, the last of which supplies techniques that are repurposed below in data analytics. Further, because multiple problems are addressed, it should be understood that some embodiments are problem-specific, and not all embodiments address every problem with traditional systems described herein or provide every benefit described herein. That said, improvements that solve various permutations of these problems are described below.

FIG. 1 illustrates a computing environment 10 having an geolocation analytics platform 12 that, in some embodiments, selects control collections to measure against when assessing the effect of sending content (like advertisements, advocacy, health information, etc.) to a population that includes one or more targeted groups, where population definition and content distribution are aided by records in network logs, and content is distributed over networks to user computing devices. In some embodiments, such effects are measured by inferring the presence of users at places of interest based on geolocation data in network logs. Through careful selection of control collections, some embodiments are operative to distinguish the effect of the content from the effect of targeting. In some cases, embodiments mitigate the effect of selection biases that arise as a result of targeting based on past network behavior. Some embodiments are configured to perform these techniques on very large data sets, with complex collections of overlapping groups of targeted users, through the use of operations designed to expedite computer operations by which testing is administered. That said, not all embodiments provide these benefits, as several independently useful inventions are described herein. Examples of the control collection selection process are described below with reference to FIG. 4, after describe the environment in which the process is performed and innovations that operate synergistically with the process.

Embodiments of the geolocation analytics platform 12 may be implemented with one or more of the computing devices described below with reference to FIG. 5, e.g., by processors executing instructions stored in the below-described memory for providing the functionality described herein. FIG. 1 shows a functional block diagram of an example of the geolocation analytics platform 12. While the functionality is shown organized in discrete functional blocks for purposes of explaining the software and hardware by which the geolocation analytics platform 12 may be implemented in some embodiments, is important to note that such hardware and software may be intermingled, conjoined, subdivided, replicated, or otherwise differently arranged relative to the illustrated functional blocks. Due to the size of some geographic data sets (which may be as large as 100 billion content requests or geolocations, or larger, in some use cases), some embodiments may include a plurality of instances of the geolocation analytics platform 12 operating concurrently to evaluate data in parallel and some embodiments may include multiple instances of computing devices instantiating multiple instances of some or all of the components of the geolocation analytics platform 12, depending on cost and time constraints.

The geolocation analytics platform 12 may be understood in view of the exemplary computing environment 10 in which it operates. As shown in FIG. 1, the computing environment 10 further includes a plurality of geographic-data providers 14, the Internet 16, a plurality of mobile user devices 18, a plurality of user-data providers 20, a content server 22, a fraud detector 24, and a site selector 26. While a relatively small number of the above-described components are illustrated, it should be understood that embodiments are consistent with, and likely to include, substantially more of each component, such as dozens of geographic-data providers 14 and user data providers 20, hundreds of fraud detectors 24, content servers 22, and site selectors 26, and millions or tens of millions of user mobile devices 18. Each of these components may communicate with the geolocation analytics platform 12 or one another via the Internet 16. Some such communications may be used to either provide data by which audiences are classified according to geolocation history and other parameters, and some embodiments may use classified audiences for various purposes, such as serving content, detecting financial fraud, selecting real-estate sites, or the like. The components of the computing environment 10 may connect to one another through the Internet 16 and, in some cases, via various other networks, such as cellular networks, local area networks, wireless area networks, personal area networks, and the like.

FIG. 1 shows three geographic-data providers 14, but again, embodiments are consistent with substantially more instances, for example, numbering in the hundreds of thousands. The geographic-data providers 14 are shown as network connected devices, for example, servers hosting application program interfaces (APIs) by which geographic data is requested by the geolocation analytics platform 12, or in webpages from which such data is retrieved or otherwise extracted. It should be noted, however, that in some cases the geographic data may be provided by other modes of transport. For instance, hard-disk drives, optical media, flash drives, or other memory may be shipped by physical mail and copied via a local area network to on-board memory accessible to the geolocation analytics platform 12. In some cases, the geographic data is acquired in batches, for example, periodically, such as daily, weekly, monthly, or yearly, but embodiments are consistent with continuous (e.g., real-time) data feeds as well. Thus in some cases, the geographic-data providers 14 may provide geolocation histories that are non-contemporaneous (relative to when they are acquired) and span a relatively large period of time, such as several hours, several weeks, or several months in the past.

In many cases, the entity operating the geolocation analytics platform 12 does not have control over the quality or accuracy of the provided geographic data, as that data is often provided by a third-party, for instance, sellers of geocoded advertising inventory, the data being provided in the form of ad request logs from various publishers. For instance, the geographic-data providers 14 may be mobile website publishers, retargeting services, and providers of mobile device applications, or native apps. In some cases, the geographic data comprehensively canvasses a large geographic region, for example, every zip code, county, province, or state within a country, or the geographic data may be specific to a particular area, for example, within a single province or state for data gathered by local government or local businesses. Publishers acting as the provider of the geographic data may be an entity with geocoded advertising inventory to sell, e.g., ad impressions up for auction (e.g., logged over time) that are associated with a geographic location at which the entity represents the ad will be presented. In some cases, pricing for such advertising inventory is a function, in part, of the quality and accuracy of the associated geographic locations.

In some cases, the geographic-data providers 14 may provide location history data (e.g., from the mobile devices 18), such as ad request logs indicating, for instance, a plurality of requests for advertisements from publishers (e.g., operators of various websites or mobile device native applications), each request being for an advertisements to be served at a geolocation specified in the request. The geographic location specified in a given request may be used by an advertiser to determine whether to bid on or purchase the right to supply the requested advertisement, and the amount an advertiser wishes to pay may depend on the accuracy and quality of the identified geolocation. These location history records may contain a plurality of such requests, each having a geolocation (e.g., a latitude coordinate and a longitude coordinate specifying where a requested ad will be served), a unique identifier such as a mobile device ID (e.g., a device identifier of a end user device 18 upon which the ad will be shown) and a timestamp. In some cases, the device identifier may be a Unique Device Identifier (UDID) or an advertiser or advertising specific identifier, such as an advertising ID.

In FIG. 1, three mobile user devices 18 are illustrated, but it should be understood that embodiments are consistent with (and most use cases entail) substantially more user devices, e.g., more than 100,000 or more than one million user devices. The illustrated user devices 18 may be mobile handheld user devices, such as smart phones, tablets, or the like, having a portable power supply (e.g., a battery) and a wireless connection, for example, a cellular or a wireless area network interface, or wearable user devices, like smart watches and head-mounted displays. Examples of computing devices that, in some cases, are mobile devices are described below with reference to FIG. 5. User devices 18, however, are not limited to handheld mobile devices, and may include desktop computers, laptops, vehicle in-dash computing systems, living room set-top boxes, and public kiosks having computer interfaces. In some cases, the user devices 18 number in the millions or hundreds of millions and are geographically distributed, for example, over an entire country or the planet.

Each user devices 18 may include a processor and memory storing an operating system and various special-purpose applications, such as a browser by which webpages and advertisements are presented, or special-purpose native applications, such as weather applications, games, social-networking applications, shopping applications, and the like. In some cases, the user devices 18 include a location sensor, such as a global positioning system (GPS) sensor (or GLONASS, Galileo, or Compass sensor) or other components by which geographic location is obtained, for instance, based on the current wireless environment of the mobile device, like SSIDs of nearby wireless base stations, or identifiers of cellular towers in range. In some cases, the geographic locations sensed by the user devices 18 may be reported to the content server 22 for selecting content based on location to be shown on the mobile devices 18, and in some cases, location histories (e.g., a sequence of timestamps and geographic location coordinates) are acquired by the geographic-data providers 20, which may include content providers. In other cases, geographic locations are inferred by, for instance, an IP address through which a given device 18 communicates via the Internet 16, which may be a less accurate measure than GPS-determined locations. Or in some cases, geographic location is determined based on a cell tower to which a device 18 is wirelessly connected. Depending on how the geographic data is acquired and subsequently processed, that data may have better or less reliable quality and accuracy.

In some use cases, the number of people in a particular geographic area at a particular time as indicated by such location histories may be used to update records in the geolocation analytics platform 12. Location histories may be acquired by batch, e.g., from application program interfaces (APIs) of third-party providers, like cellular-network operators, advertising networks, or providers of mobile applications. Batch formatted location histories are often more readily available than real-time locations, while still being adequate for characterizing longer term trends in geographic data. And some embodiments may acquire some locations in real time (e.g., within 2 seconds of a request), for instance, for selecting content (like an advertisement, review, article, or business listing) to be displayed based on the current location.

The user-data providers 20 may provide data about users that is not necessarily tied to geolocation, such as purchasing history, media viewing history, automotive records, social networking activity, and the like. In some cases, user-data providers 20 include credit card processors, banks, cable companies, or television rating services. In some embodiments, user-data providers include microblogging services, location check-in services, or various other social networks. In some cases, audience classification according to geolocation may be supplemented with such data, for instance, according to the appearance of various keywords in social network posts, linkages between users indicated by social networks, or patterns in buying or reviewing behavior. In some cases, various features may be extracted from such data and included in the analysis described below for identifying audiences.

The illustrated content server 22 is operative to receive a request for content, select content (e.g., images and text), and send the content for display or other presentation to a user. One content server 22 is shown, but embodiments are consistent with substantially more, for example, numbering in the thousands. In some cases, the content is advertisements and advertisements are selected or bid upon with a price selected based on the geographic location of a computing device upon which an advertisement will be shown, which may be indicated by one of the geographic-data providers/content servers, or such entities may also be a publisher selling the advertising inventory. Accordingly, the accuracy and quality of such geographic data may be of relevance to the parties selling or buying such advertising space. The selection or pricing of advertisements may also depend on other factors. For example, advertisers may specify a certain bid amount based on the attributes of the geographic area documented in the geolocation analytics platform 12, or the advertiser may apply various thresholds, requiring certain attributes before an advertisement served, to target advertisements appropriately.

Some embodiments include a fraud detector 24 which may include an automated process run by a financial institution that detects anomalous behavior indicative of fraud based, in part, on correlations (or lack thereof) between financial transactions and patterns identified by the geolocation analytics platform 12. For instance, in some embodiments, the fraud detector 24 may submit a query to the geolocation analytics platform 12 based on a financial transaction, such as the purchase of a particular type of automobile, and the geolocation analytics platform 12 may respond with an audience classification of the user. In some embodiments the fraud detector 24 may determine whether the user who engaged in the financial transaction is likely to be a member of the audience for such purchases based on the data provided by the geolocation analytics platform 12. For example, a user who is not a member of an audience in Austin, Tex. that is present in Austin golf courses regularly, upon purchasing a set of golf clubs, may trigger a fraud alert, when the fraud detector receives a report for the geolocation analytics platform 12 that the user is not a member of an Austin, Tex., golf-playing audience. In some cases, the fraud detector may maintain an ontology of types of financial transactions and audiences associated with those transactions. Upon receiving a record of a financial transaction, the fraud detector may query audiences corresponding to the user, the location, and the time of the transaction, and determine whether the responsive audiences match those associated with the type of financial transaction in the ontology. Fraud may be detected based on the absence of such matches.

In some embodiments, the site selector 26 may categorize geographic areas as appropriate sites for various activities, such as positioning stores, allocating government resources, or distributing content into various zones based on geolocations frequented by audiences identified by the geolocation analytics platform 12. For instance, the site selector 26 may submit a request for zones in which members of a particular audience are present during lunch time and position restaurants in those zones.

In some embodiments, the geolocation analytics platform 12 may include a controller 28 that directs the activity of and routes data between the various components of the geolocation analytics platform 12. In some cases, the functionality of the controller may be divided into various processes, such as a separate controller for ingesting data, cleaning and normalizing data, classifying audiences and zones, targeting content, and evaluating the success of such targeting in driving visitation to various geographic locations. In some embodiments, activities other than programmatic content targeting may be performed as batch processes at times scheduled by the controller 28, such as daily or hourly, non-contemporaneously with when such data is used, to facility faster responses when the pre-processed data is used.

Some embodiments may include an ingest module 30 operative to retrieve data from the geographic-data providers 14 and user-data providers 20 via various APIs of such services. In some cases, such data may be routed by the controller 28 to a geographic data evaluator 62, examples of which are described in U.S. patent application Ser. No. 14/553,422, which is incorporated by reference in its entirety. The geographic-data evaluator may evaluate the quality of geographic data by geographic data provider and detect suspect, low-quality geographic data. Data from such providers with a history of providing low-quality data may be rejected from, or down-weighted in, the analyses described below, or such data providers may be stored with corresponding scores for purposes of bidding on the opportunity to serve advertisements or other content via such providers, for instance, in response to a content request for a website hosted by such a geographic-data provider.

Some embodiments may include an application program interface server 32, which may receive requests for information about audiences and geographic locations from the various entities operating devices 22, 24, and 26. In some cases, this may include requests by a third party content targeter for audiences corresponding to a current user device, at a current geolocation, requesting content at a current time (e.g., within the previous two seconds or so). In some cases, responsive data may include a list of audiences corresponding to these inputs or a list of scores for a plurality of audiences indicative of how well those inputs correspond to those audiences. In other examples, the request may include a request for an inventory of geographic areas corresponding to a specified audience, such as geographic areas or categories of places frequented by mobile device users who also frequent a given store or category of stores.

Some embodiments may include a geographic-data repository 34. The geographic-data repository 34, in some embodiments, stores geographic data from the geographic-data providers 14 and associated quality profiles of the geographic data, including measures of geographic data quality and accuracy provided by the geographic-data evaluator 62. In some embodiments, content providers, such as advertisers, or publishers, or others interested in the quality of geographic data from a given data provider 14 may query the geographic-data repository 34 for information output by the geographic-data evaluator 62.

Some embodiments may include a geographic information system 36. The geographic information system 36 may be configured to provide information about geographic locations in response to queries specifying a location or attribute of interest (or combinations thereof). In some embodiments, the geographic information system (GIS) 36 organizes information about a geographic area by quantizing (or otherwise dividing) the geographic area into area units, called tiles, that are mapped to subsets of the geographic area. In some cases, the tiles correspond to square units of area having sides that are between 10-meters and 1000-meters, for example, approximately 100-meters per side, depending upon the desired granularity with which a geographic area is to be described. Tiles are, however, not limited to square-shaped tiles, and may include other tilings, such as a hexagonal tiling, a triangular tiling, or other regular tilings (e.g., for simpler processing), semi-regular tilings, or irregular tilings (e.g., for describing higher density areas with higher resolution tiles, while conserving memory with larger tiles representing less dense areas). In some cases, such tilings may facilitate relatively fast access to data, such as in-memory data structures responsive to queries without retrieving data from a hard disk, though embodiments are not limited to systems that provide this benefit, which is not to suggest that any other feature described herein may also be omitted in some embodiments.

In some cases, polygons corresponding to businesses and other places, points corresponding to points of interest, and lines corresponding to roads, railroad tracks, and the like may also be stored in the geographic information system 36 as geographic features. In some cases, attributes of tiles overlapping such features may be mapped to these features, e.g., in proportion to the amount of area of a tile occupied by the corresponding feature and as a weighted combination of multiple tiles in which such a feature may be disposed, for instance, with such weights being proportional to the amount area of the feature in each respective tile. In some cases, the described attributes of the tiles may be mapped directly to the features, e.g., with a record for each such a feature, or subset of such a feature, like a floor of a store, or aisle of a store, with the features grouped according to the tile in which they are disposed for relatively fast searching of features by first retrieving a group of features in a single tile. To simplify the mapping, in some cases, irregular tiles may correspond to the boundaries of features.

In some cases, the attributes of a geographic area change over time. Accordingly, some embodiments divide each tile (or feature, if characterized separately, for example) according to time. For instance, some embodiments divide each tile into subsets of some duration of time, such as one week, one month, or one year, and attributes of the tile are recorded for subsets of that period of time. For example, the period of time may be one week, and each tile may be divided by portions of the week selected in view of the way users generally organize their week, accounting, for instance, for differences between work days and weekends, work hours, after work hours, mealtimes, typical sleep hours, and the like. Examples of such time divisions may include a duration for a tile corresponding to Monday morning from 6 AM to 8 AM, during which users often eat breakfast and commute to work, 8 AM till 11 AM, during which users often are at work, 11 AM till 1 PM, during which users are often eating lunch, 1 PM till 5 PM, during which users are often engaged in work, 5 PM till 6 PM, during which users are often commuting home, and the like. Similar durations may be selected for weekend days, for example 8 PM till midnight on Saturdays, during which users are often engaged in leisure activities. In some cases the divisions of time are logically connected but are disjoint, for instance, morning and evening commute times may be classified in a single category of time corresponding to commuting. Each of these durations may be profiled at each tile.

In some embodiments, the geographic information system 36 includes a plurality of tile (or feature, if separately tracked) records, each such record corresponding to a different subset of a geographic area. Each tile (or feature) record may include an identifier, an indication of geographic area corresponding to the tile (which for regularly sized tiles may be the identifier from which location can be calculated or may be a polygon with latitude and longitude vertices, for instance), and a plurality of tile-time records. Each tile-time record may correspond to one of the above-mentioned divisions of time for a given tile, and the tile-time records may characterize attributes of the tile at different points of time, such as during different times of the week. Each tile-time (or feature-time) record may also include a density score indicative of the number of people in the tile at a given time. In some embodiments, each tile-time record includes an indication of the duration of time described by the record (e.g., lunch time on Sundays, or dinnertime on Wednesdays) and a plurality of attribute records, each attribute record describing an attribute of the tile at the corresponding window of time during some cycle (e.g., weekly). Some embodiments may include seasonal variants of such time designations, e.g., a set of time categories for the Christmas season, a set for Summer, and a set for the remainder of the year, constituting a type of time-tile record called a time-tile-season record.

The attributes may be descriptions of activities in which users (e.g., of third party services that provide data to the geolocation analytics platform 12) engage that are potentially of interest to advertisers or others interested in geographic data about human activities and attributes (e.g., geodemographic data or geopsychographic data). For example, some advertisers may be interested in when and where users go to particular types of restaurants, when and where users play golf, when and where users watch sports, when and where users fish, or when and where users work in particular categories of jobs. In some embodiments, each tile-time record may include a relatively large number of attribute records, for example, more than 10, more than 100, more than 1000, or approximately 4000 attribute records, depending upon the desired specificity with which the tiles are to be described. Each attribute record may include an indicator of the attribute being characterized and an attribute score indicating the degree to which users tend to engage in activities corresponding to the attribute in the corresponding tile at the corresponding duration of time. In some cases, the attribute score (or tile-time record) is characterized by a density score indicating the number of users expected to engage in the corresponding activity in the tile at the time. In some cases, attributes may be organized in a hierarchical ontology, for instance, businesses→retail→convenience_stores, or demographic→suburbanite→young_professional.

Thus, to use some embodiments of the geographic information system 36, a query may be submitted to determine what sort of activities users engage in at a particular block in downtown New York during Friday evenings, and the geographic information system 36 may respond with the attribute records corresponding to that block at that time. Those attribute records may indicate a relatively high attribute score for high-end dining, indicating that users typically go to restaurants in this category at that time in this place, and a relatively low attribute score for playing golf, for example. Or a query may request tiles or features for which a given attribute score is exhibited. Attribute scores may be normalized, for example, a value from 0 to 10, with a value indicating the propensity of users to exhibit behavior described by that attribute. In some cases, scoring attributes according to a discrete set of normalized values may facilitate use of in-memory data structures that provide relatively fast access to information, though embodiments are not limited to systems that provide this benefit, which is not to suggest that any other feature described herein may also be omitted in some embodiments. Further, the attribute scores may be pre-calculated before such scores are used in an analysis, as some forms of analysis are relatively latency sensitive, such as content selection, which users are expected prefer to have happen within less than 500 milliseconds, while calculating attribute scores may take substantially longer.

In some cases, the user-profile repository 38 may store profiles of users of mobile devices 18 that are based on a user's geolocation history and in some cases data from user-data providers 20. In some cases, these user profiles may be created by a user profiler 56, an example of which is described in U.S. Pat. No. 8,489,596, the entire contents of which are incorporated by reference. The user profiler 56 may join the location histories of user devices corresponding to a user and tile records implicated by locations in those location histories to generate user profiles. Thus, users may be characterized according to the attributes of the places those users visit at the time the user visits those places. The generated user profiles may then be stored by the user profiler 56 in the user-profile repository 38.

The illustrated user-profile repository 38 includes a plurality of user-profile records, each record corresponding to the profile of a given user or a given mobile device 18. Each user-profile record may include an identifier of the record (which may be a value otherwise uncorrelated with the identity of the user to enhance privacy), and an identifier of the source or sources of the location histories from which the profile was created such that subsequent location histories can be matched with the profile (e.g. a account associated with a special-purpose native application, a cell phone number, or some other value, which may be hashed to enhance user privacy).

Each user-profile record may also include a plurality of profile time (or profile-time-season) records indicating attributes of the user profile at different times during some cycle of time (e.g., portions of the week or month, or during other periods like those described above with reference to the geographic information system 36). In some cases, the profile-time records may correspond to the same durations of time as those of the time-tile records described above. Each profile-time record may include an indication of the duration of time being described (e.g. Thursdays at dinnertime, or Saturday midmorning) and a plurality of profile attribute records, each profile attribute record indicating the propensity of the corresponding user to engage in an activity, or exhibit a property, described by the attribute during the corresponding time of the profile-time record. The profile time records may allow tracking of when users tend to engage in a given activity (e.g., time of day, day of week, week of year). In some embodiments, the profile attribute records correspond to the same set of attribute records described above with reference to the geographic information system 36. Each profile-attribute record may include an indication of the attribute being characterized (e.g., attending a children's soccer game, having brunch at a fast-casual dining establishment, parent running errands, or shopping at a mall) and a score indicating the propensity of the user to engage in the activity at the corresponding time, such as a normalized value from 0 to 10. The attribute records may further include a sample size, indicative of the number of samples upon which the attribute score is based, for weighting new samples, and a measure of variance among these samples (e.g., a standard deviation) for identifying outliers.

As described below, the user-profile records may be used for a variety of purposes. For example, publishers operating content server 22 may submit to the geolocation analytics platform 12 a query identifying one of the user-profile records, such as a hashed value of a user account number or phone number, and the geolocation analytics platform 12 may respond with the attributes of the corresponding user at the current time. In some embodiments, to further enhance user privacy, queries may be submitted for a specific attribute to determine whether to serve content corresponding to the attribute, or a query may request a binary indication of whether the attribute score is above a threshold.

In another example, the user-profile repository 38 may be used by the user profiler 56 to augment the records in the geographic information system 36. For example, an index may be created for each attribute that identifies tiles where users having relatively strong scores (e.g. above a threshold) for the respective attribute tend to co-occur at given times. These indices may correspond to heat maps (though no visual representation need be created) indicating where, for example, users interested in golf tend to be during various times of the day, such that content-providers can select content based on this information, or related services may be positioned nearby. In some embodiments, an index may be created for each user attribute at each of the above-described divisions of time in the geographic information system 36, and these indices may be queried to provide relatively prompt responses relating to where users having a given attribute or combination of attributes tend to co-occur at various times. Precalculating the indices is expected to yield faster responses to such queries than generating responsive data at the time the query is received. For instance, using examples of these indices relating to fishing and employment in banking, an advertiser may determine that people who engage in fishing on the weekend and work in banking tend to drive relatively frequently along a particular stretch of road on Mondays during the evening commute, and that advertiser may purchase an advertisement for bass fishing boats as a source of relaxation for bankers on a billboard along that road in response.

In some cases, user profiles may be supplemented with data from the user-data providers 20. In some embodiments, a user-data repository 40 may store such data as it is acquired for further analysis. Further, in some embodiments, the quality of data from such data providers may be scored, and such scores may be associated with identifiers of the providers in the user-data repository 40. In some embodiments, this data may be down-weighted or rejected based on indicators of low-quality.

Some embodiments may include an audience repository 40 storing records by which audience membership may be determined. These records, in some cases may be created and accessed by an audience classifier 54 described below with reference to FIGS. 2 and 3. In some cases, audience membership is pre-calculated before a query is received, for example, for each recognize query within some parameter space, for instance, for every type of attribute record, pair of attribute records, or attribute record combined with larger geolocation area, like weekend golfers in the state of Texas. In some cases, parameters of models by which audience membership is determined may be stored in the audience repository 42, for example, learned parameters that are pre-calculated according to training sets. In some cases, an audience membership vector may be calculated based on a given geographic location, a given user identifier (e.g., a device identifier), and given time, with each component of the vector indicating membership in a corresponding audience. In some cases, membership may be binary, or some embodiments may score membership, for example from 0 to 10 depending on the probability of membership in the corresponding audience given the inputs. In some cases, each component of the audience vector may be calculated according to an audience member function that is a combination (e.g., weighted sum) of feature functions. Examples of such feature functions may include scores indicating whether a given user is currently within a tile having a particular attribute score (or collection of attribute scores) above a threshold, whether a given user has visited tiles having a particular attribute score above a threshold at particular times more than a threshold amount of times within some trailing duration, and the like. In some cases, a collection of audience vectors for each user may be stored in the respective user profile, e.g., as a sparse matrix having rows or columns indexed according to times and geolocations at which the corresponding audience vector applies. In some cases, identifying feature functions with predictive value can be relatively challenging given the relatively large, high-dimensional search space of candidate feature functions in many commercially relevant implementations. Techniques for discovering such features are described in greater detail below with reference to FIG. 2.

Some embodiments may include a zone repository 44, which may include zone records populated by a zone classifier 52. Zones may be geographic areas associated with audiences. For example, some embodiments may identify geographic areas that students at a local university tend to visit, with the corresponding audience being likely students at a given university or collection of universities, or those who are regularly at such universities (e.g., more than a threshold amount of times in a trailing duration of time). In some cases, the zone repository may include zone records that list tiles or time tiles likely to be visited by members of particular audiences. In some cases, zones may be classified according to an amount of mutual information between of events corresponding to audience membership and members of those audiences visiting particular tiles. In some cases, the mutual information may be calculated in terms of a conditional entropy, and tiles having the highest mutual information (for example, greater than a threshold amount of tiles, like a threshold percentage) may be selected for consideration as members of the zone for that audience.

In some cases, the selected candidate tiles may be clustered and resulting clusters may be designated as zones. Some embodiments may execute a density-based clustering algorithm, like DBSCAN, to establish groups corresponding to the resulting clusters and exclude outliers. Some embodiments may examine each of the geolocations reflected in the records and designate a tile as a core tile if at least a threshold amount of the other tiles in the records are within a threshold geographic distance or number of tiles. Some embodiments may then iterate through each of the tiles and create a graph of reachable geolocations, where nodes on the graph are identified in response to non-core corresponding tiles being within a threshold distance of a core tile in the graph, and in response to core tiles in the graph being reachable by other core tiles in the graph, where two tiles are reachable from one another if there is a path from one tile to the other tile where every link and the path is a core tile and the tiles in the link are within a threshold distance of one another. The set of nodes in each resulting graph, in some embodiments, may be designated as a cluster, and points excluded from the graphs may be designated as outliers that do not correspond to clusters. Outliers may be excluded from zones in some cases.

Some embodiments may include a visit-metrics repository 46 having records created by a visitation rate module 48. In some cases, the records may indicate the degree to which content targeted to particular users succeeded in driving those users to visit a targeted geographic location, for example, records indicating whether an advertisement targeted to users in a particular neighborhood succeeded in driving those users to visit a particular store. In some cases, the visitation rate module 48 may include the visitation rate module of U.S. patent application Ser. No. 13/769,736, the entire contents of which are incorporated by reference. In some cases, visitation rates may be adjusted to account for undercounting of undetected people, for example, those not employing cell phones while in the targeted location or employing cell phones that are not detectable, for instance, due to lack of signal quality for a particular type of handset or carrier. In some cases, such undercounting may correlate with various attributes of the user, including the user's mobile device, and some embodiments may adjust detected visitation rates to account for such undercounting. Some embodiments may measure a marginal increase in an amount of visits to a target geographic location likely to be attributable to targeted content. For example, some embodiments may identify audience members, serve targeted content to some of the audience members (e.g., a treatment group), and compare visitation amounts (e.g., calculate a statistically significant amount of difference between) between those audience members that receive the targeted content and those that did not (e.g., a control collection of the audience) to determine a marginal increase attributable to the targeted content. Feedback from such measurements may be used to tune audience classification algorithms or select among audiences, e.g., dynamically unselecting audiences for which a response fails to satisfy a visitation threshold. That said, not all embodiments necessarily provide these benefits, which is not to suggest that any other feature may not also be omitted in some cases.

Some embodiments may include a programmatic content targeter 50. In some cases, this module may automatically determine whether to provide content and which content to provide, in some cases at the time of the content request, based on classification of audiences or zones. In some embodiments, the programmatic content targeter 50 may programmatically determine audience membership and determine a bidding amount for submitting a bid to an online auction to provide an advertisement to a given user. To facilitate relatively fast responses to such time sensitive requests, some embodiments may pre-calculate zone classifications and audience classifications and index those classifications according to parameters of a content request (e.g., according to key values based on (such as hash values of) one or more of a device or user identifier, a geographic location, and a category of time corresponding to the time tile records). In some cases, bidding may be real-time, e.g., within less than 500 milliseconds of when an ad is requested, and often even sooner. In other cases, advertising space may be pre-purchased programmatically before ad requests, e.g., based on expected audience behavior in the coming hours or days. In other cases, other types of content may be programmatically targeted, e.g., business listings or articles based on audience membership. Programmatic targeting based on audience classification is expected to reduce labor costs relative to manual tuning and targeting of content. That said, not all embodiments necessarily provide these benefits, which is not to suggest that any other feature may not also be omitted in some cases.

Some embodiments may include an anonymized-user-identifier matcher 58, an example of which is described in U.S. patent application Ser. No. 14/334,066, the entire contents of which are incorporated by reference. In some cases, a user may switch mobile devices or be reassigned a device identifier. Re-creating a user profile for that user based on the new identifier can be time-consuming and particularly difficult at commercially-relevant scales. Accordingly, some embodiments of the matcher 58 may detect matches between geolocation patterns of a new user identifier and an old user identifier to assign that new identifier to an existing user profile when such matches are detected. This is expected to yield more accurate classifications of audiences based on more complete data for individuals using two different devices. That said, not all embodiments necessarily provide these benefits, which is not to suggest that any other feature may not also be omitted in some cases.

Some embodiments may further include a geographic-data projector 60, an example of which is described in U.S. patent application Ser. No. 13/938,974, the entire contents of which are incorporated by reference. In some cases, geographic-data providers may provide data at a relatively low resolution, e.g., census data reported at the zip code level. Some embodiments may un-evenly project such values onto higher-resolution geographic areas (e.g., some instances of the tile records or corresponding geographic features) within the low-resolution area based on a distribution of a population within that larger geographic area. Accordingly, some embodiments may enrich the records of the geographic information system 36 by which audiences and zones are identified with information that would otherwise be inapplicable or inaccurately applied. That said, not all embodiments necessarily provide these benefits, which is not to suggest that any other feature may not also be omitted in some cases.

Figure 2:
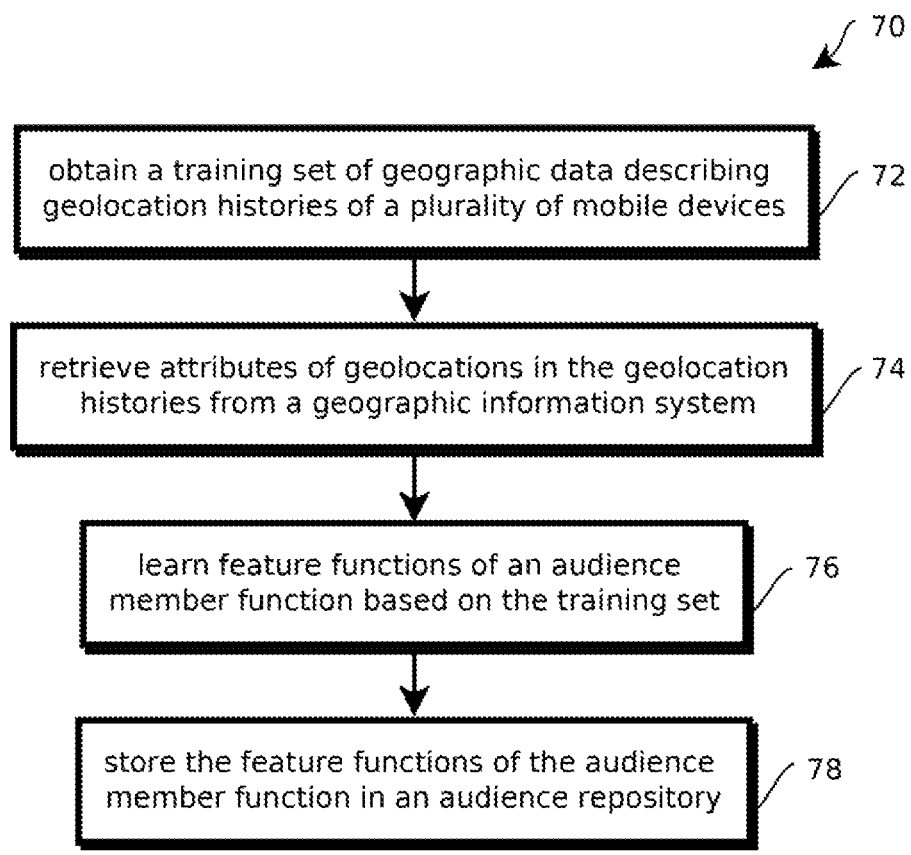
FIG. 2 shows an example of a process for learning an audience member function.
Figure 3:
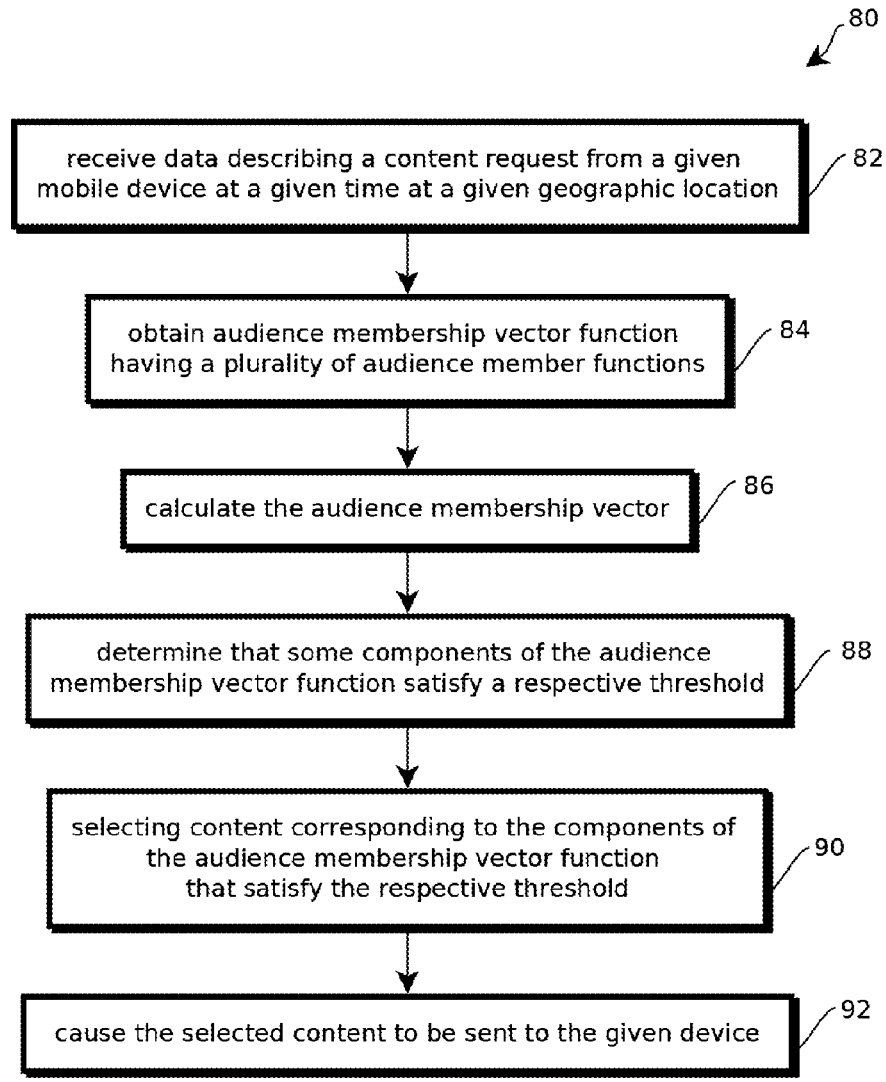
FIG. 3 shows an example of a process of targeting content based on an audience membership vector function including the audience member function of FIG. 2.

FIGS. 2 and 3 show techniques for modeling and detecting audiences. In some cases, the techniques may include an adaptive process by which features indicative of audience membership are programmatically learned, e.g., by iteratively modeling the audience and adjusting the model to reduce a measure of error produced by the model when applied to a training set of data in which audience membership status is known. Some embodiments may be configured to learn weights for combining (e.g., in a weighted sum, or in a neural net) features into a classification or score of probability of audience membership. Some embodiments may be configured for real-time model optimization by re-learning these parameters in the face of new data. Some embodiments may be configured to automatically discover, select, and score the importance of features in relatively high-dimensional data for classifying an audience.

FIG. 2 shows an example of a process 70 for learning an audience member function based on training data. In some cases, the model includes obtaining a training set of geographic data describing geolocation histories of a plurality of mobile devices, as indicated by block 72. Obtaining such a training set may include querying the user-profile repository 38 or the geographic information system 36 to identify users who have previously engaged in a targeted behavior. Targeted behaviors may serve as a training set selection criteria. In some cases, targeted behaviors include visiting a particular store within a threshold duration of time or with greater than a threshold frequency in a threshold duration of time. In another example a targeted behavior may include visiting a category of store according to such criteria. In another example, targeted behaviors may include exhibiting demographic attributes, like being a suburban young professional who plays golf on the weekend in the state of California more often than once a month over the trailing year. In some cases, training sets corresponding to relatively specific targeted behaviors may be retrieved relatively quickly with a distributed, scripted parallel program implemented with the techniques described in U.S. Provisional Patent Application 62/066,100, the contents of which are hereby incorporated by reference. Relatively fast, iterative exploration of candidate targeted behaviors with these techniques is expected to yield training sets suitable for creating well-crafted audiences. That said, not all embodiments provide this benefit, as various independently useful inventions are described herein.

The obtained training set may include geolocation histories, user profiles, and user data (e.g., financial transactions, television viewing patterns, social network activity, and the like) for each of a plurality of users who have exhibited the targeted behavior. In some cases, such data may include a relatively large number of dimensions, for example, including attribute scores for each of the above-described attributes, attribute scores for each of the above-attributes relating to behavior within some threshold duration of time, and attribute scores for each of the above described attributes relating to behavior with greater than a threshold frequency within a threshold duration of time. Further, such dimensions may include scores for the other user data, such as frequencies or amounts of financial transactions indicating purchases in a given category, such as frequencies or amounts of purchases within a threshold duration of time. Other examples may include amounts of adjacent nodes in a social network quantified with the above-described dimensions or frequency or amounts of viewing particular television shows or particular categories of television shows.

In some cases, the process 70 may include retrieving attributes of geolocations in the geolocation histories from a geographic information system, as indicated by block 74. In some cases, such attributes may be retrieved in the course of generating the above-described user profiles. In other cases, such attributes may be retrieved at the time of model training. For example, a given location history for a given user may indicate that the user within a given tile (for example, a particular tile for more than a threshold duration of time or more than a threshold frequency), and the attributes of that tile (or geographic feature, if independently tracked), or of that time tile may be retrieved from memory to serve as dimensions from which features are selected for an audience membership function. This technique may be used in cases in which the tiles correspond to or are overlaid with features, like polygons, corresponding to businesses in other geographic features to which attributes are mapped, by determining which features include the user's location and acquiring attributes of those features.

Some embodiments may learn feature functions of an audience member function based on the training set, as indicated by block 76. In some cases, audience member functions may be learned by training various types of machine learning classification or regression models, such as support vector machines, self organizing maps, binary classification decision trees, or regression decision trees.

By way of example, let device $d_z$ generate a content-request at time i within tile j, a request which may be represented as $r_{i,j,z}$. Some embodiments may obtain an audience-membership vector function $\bar{t}(r_{i,j,z})$ where its kth dimension has value 1 if device $d_z$ is deemed to belong to the kth audience in the audience set, and 0 otherwise. Other embodiments may produce a more fine-grained score indicative of membership, e.g., a value between 0 and 1. Some embodiments may detect K discrete audiences.

In one simpler case, the audiences represented in vector $\bar{t}(r_{i,j,z})$ are all categorical, audiences which are expressible as the intersection of tiles and time period categories, and device histories play no role in the audience membership functions ($f_k(\ )$). Thus, in this example, $\bar{t}(r_{i,j,z})=[f_1(i, j), f_2(i, j), \ldots, f_K(i, j)]$. In some cases, these functions may be pre-computed, before a content (e.g., ad) request is received and stored in sparse tables and cached in memory for fast retrieval.

In a more general case, some embodiments may compute $\bar{t}(r_{i,j,z})$ based on more general features. To this end, some embodiments may calculate an audience membership functions $f_k(r_{i,j,z})$ and determine whether resulting values satisfy a respective ones of a collection of thresholds $t_k$ so that:

$$\bar{t}_k = \begin{cases} 1 & \text{when } f_k(r_{i,j,z}) > t_k \\ 0 & \text{otherwise} \end{cases}$$

In some cases, thresholds $t_k$ may be heuristically established by an analyst and feature functions may be crafted by an audience designer. In other cases, such activities may be automated.

Some audience membership functions may consider richer features. In some cases, such functions may represent class posterior probabilities as follows:

$$f_k(r_{i,j,z}) = p(\text{audience} = c_k | \text{features}_{r_{i,j,z}})$$

Where $\text{features}_{r\_sub\_i,j,z}$ is the collection of features generated after knowing i, j, and z, or the device (or user, in the case where a given user has multiple correlated devices), time, and location of the request.

Some embodiments may model these probabilities with an adaptive basis function model approach, such as that described in chapter sixteen of K. Murphy. *Machine Learning: A probabilistic approach, Adaptive Computation and Machine Learning series* (The MIT Press, 2012), a chapter which is incorporated by reference. In some cases, such a model may be expressed as follows:

$$p(\text{audience} = c_k | \text{features}_{r_{i,j,z}}) \propto f_k(\text{features}_{r_{i,j,z}})$$

with the form:

$$f_k(\text{features}_{r_{i,j,z}}) = w_0 + \sum_{m=1 \ldots M} w_m \phi_m(i, j, z)$$

Where $\theta_m(i,j,z)$ is the m'th basis function that is learned from the training set, $w_m$ is the mean response in a region corresponding to the m'th basis function, and $w_0$ is an offset. In some cases, both weights and parameters of the basis function itself may be learned, in contrast to less expressive models that merely learn weights with a fixed basis function, like many simpler neural nets.

This formulation, in some cases, offers several advantages, allowing content targeters to robustly work with a combination of categorical and continuous features, large-dimensional spaces, missing values, kernel approaches, etc. Some embodiments may further include hierarchical models where probabilistic classifiers feed class posterior probabilities as features in this function. That said, not all embodiments provide these benefits, as various independently useful inventions are described.

In some cases, an audience member function may be learned by growing a binary regression or classification tree. In some cases, such a tree may be calculated, or grown, by recursively dividing a vector space occupied by the training data such that a training error is minimized in each division. In some cases, such divisions may be selected with a greedy algorithm that minimizes training error at a given iteration, rather than globally, to reduce computational complexity.

In some cases, the training data may be characterized as a collection of vectors, with each vector corresponding to an individual that engaged in the targeted behavior, and each component of such vectors corresponding to a candidate dimension from which a feature may be selected. As noted above, candid dimensions include, for example, various attribute scores of user profiles and tiles visited by users, in some cases, aggregated across trailing durations of time or quantified according to frequency within some trailing duration of time. In some cases, such vectors may have a relatively large number of dimensions, such as more than 10 for simpler cases, more than 1,000, and more than 10,000 for relatively rich data sets.

In some cases, a binary classification or regression decision tree may be grown by selecting a dimension and the value for that dimension in the vector space that minimizes or reduces a training error when the vector space is divided parallel to that dimension at that value, e.g., in a three-dimensional example, by a plane having a normal vector parallel to the chosen dimension and crossing an axis of the chosen dimension at the value chosen. Some embodiments may iterate through every dimension and every value (or between pair of adjacent values, when sorted) occupied by a vector in the training set in the respective dimension (as splits are expected to occur between values occupied by vectors) to calculate a training error for a split in vector space along that dimension between the respective values. Training errors for a plurality of candidate splits, each split being characterized by a pair identifying a value and a dimension, may be calculated, and some embodiments may select the split having the lowest training error.

In some cases, the training error may be characterized as an impurity measure indicative of the purity with which the candidate division in vector space, or split, separates vectors corresponding to audience members from vectors corresponding to non-audience members. For example, a division, or split, in which 9/10 vectors are audience members on one side and 8/10 vectors are non-audience members on the other may have a lower impurity measure relative to a division in which 6/10 vectors are audience members on one side and 7/10 vectors are non-audience members on the other side. Various impurity measures may be calculated, including a misclassification rate based on the proportion of vectors and each division that are misclassified if each division classifies according to a majority vote of vectors in the respective division. In other examples of an impurity measure, and entropy of audience members and non-audience members on each side of the division may be calculated or a Gini index may be calculated.

In some cases, to expedite processing, the evaluation of candidate splits may be executed in parallel by assigning different candidate dimensions and different candidate values within those dimensions to different computing nodes in a distributed computing network. For example, some embodiments may map candidate splits to one set of computing nodes and reduce impurity measures from the resulting regions with a different set of computing nodes, for instance, according to a MapReduce algorithm executed by a distributed computing network having a plurality of computing nodes, such separate computers or separate instances of virtual machines.

After a split, as a result of the split, the portion of vector space at issue may be divided into two regions divided in a selected dimension at a selected value. The division may be characterized as a node in a binary decision tree, the node corresponding to a split rule, like weekend golfer score greater than seven, and the two resulting regions may be characterized as edges extending from that node in a binary decision tree, each edge representing an outcome of the decision rule, like true or false. In some cases, the subregions corresponding to each of those edges may be recursively subjected to the above-described procedure for dividing a region of vector space such that the training error is minimized in the division of the portion of vector space at issue. Training vectors in one subregion may undergo the above process, and training vectors in the other subregion may separately undergo the above process, producing four sub-subregions. Such divisions may yield additional nodes in a decision tree corresponding to additional rules, for example, young professional attribute score less than three, and additional subdivisions of the vector space. This process may be repeated recursively until a stopping condition is satisfied in each branch of the binary decision tree.

A variety of stopping conditions may be evaluated before performing a split on a region of vector space. A determination may be made as to whether all vectors in the region of vector space are all members of the audience in the training set, or a determination may be made as to whether all vectors in the region of vector space are all not members of the audience in the training set. In either case, the region of vector space may not be further subdivided in response, and the resulting region may be designated as a leaf node indicating that vectors in the corresponding region are to be designated as audience members or not audience members, depending upon whether all members of the training set are audience members or not audience members. In another example of a stopping condition, some embodiments may count a number of training vectors in a candidate split or in a input region and decline to make the candidate split or further split the subregion in response to the count being less than a threshold value to avoid overfitting, e.g., with a large number of leaf nodes each corresponding to a single respective vector.

In some cases, the resulting leaf nodes of the binary decision tree may correspond to classifications of whether vectors in the regions of space described by those leaf nodes are audience members or not audience members. For example, if a majority of training vectors in a leaf node region are audience members, some embodiments may designate later-received, non-training vectors (e.g., when the model is applied) in those regions as corresponding to audience members, and vice versa. The model may be applied by navigating the decision tree to a leaf node based on dimensions of a vector to be classified, and classifying the vector according to the leaf node's relative amount of audience member and non-audience member training vectors. In some cases, the designation may be associated with a confidence value corresponding to the impurity value of the region described by the leaf node.

In some embodiments, resulting decision trees may be pruned to reduce overfitting. For example, a training error may be calculated for each leaf node, the leaf nodes may be ranked according to training error, and those leaf nodes above a threshold position in the ranking, having the greater training errors, may be pruned from the tree.

In some embodiments, such decision trees may be relatively unstable and sensitive to relatively small changes in inputs. To mitigate such instabilities, some embodiments may perform a bootstrap aggregation by subsampling the training data, calculating binary decision trees on the subsamples in a plurality of iterations, and then aggregating the resulting plurality of decision trees to produce an aggregated binary classification decision tree.

The resulting binary classification decision tree (e.g., one or more per audience) may be stored in the audience repository, for example, by storing feature functions of the corresponding audience member function in the audience repository, as indicated by block 78. In some embodiments, such feature functions and the audience member functions to which they belong may be precalculated before audience classification is performed on nontraining data to facilitate relatively fast retrieval and classification. For example, audience member functions may be calculated daily or hourly for a particular geographic region in which a given content provider is interested, thereby providing relatively low latency audience classification that is responsive to changing conditions in user behavior.

FIG. 3 shows an example of a process 80 by which a request for content may be serviced by designating the request as corresponding to one or more audiences and selecting responsive content. In some embodiments, the process 80 includes receiving data describing the content requests from a given mobile device at a given time at a given geographic location, as indicated by block 82. In some cases, the request includes a device identifier that may be correlated to a user profile and location history, and a given time, and may be a timestamped geolocation, such as latitude and longitude, sensed by the mobile device, for example, at the time of a request for advertising content or other content.

Next, some embodiments may obtain an audience membership vector function having a plurality of audience member functions, as indicated by block 84. In some embodiments, some or all of the audience member functions may be learned with the process described above with reference to FIG. 2. In other cases, some of the audience member functions may be obtained with other techniques, such as hand-coded rules specifying particular time tiles that correspond to audiences. In some embodiments, the audience membership vector function may include a relatively large number of candidate audiences, such as more than 10, or more than 100, depending upon the granularity with which content is to be targeted. Relatively granular targeting is expected to facilitate selection of relatively highly customized content to which subgroups of populations are expected to be responsive. In some cases, the audience membership vector function may be retrieved from the audience repository 42, for example, by the audience classifier 54 at the direction of the programmatic content targeter 50, as shown in FIG. 1.

Next, some embodiments may calculate the audience membership vector, as indicated by block 86. In some cases, the request for content may be encoded as a vector, like those used in the training sets described above. For example, dimensions of the vector may include the current time, or corresponding time tile designation of the user, attributes of the user's current geolocation, such as tile attributes, and various attributes of a user profile or data in user location history of a user corresponding to a device identifier in the request for content. In some embodiments, for each dimension of the audience membership vector, a corresponding audience member function may be retrieved and calculated with the vector of the request as an input. In some cases, such calculation may include navigating a plurality of the binary classification decision trees produced with the above described techniques. In some embodiments, the request vector may be designated as corresponding to the respective audience based on whether a leaf node of the corresponding tree had a majority of training vectors in the audience or not in the audience (e.g., a majority in the audience means the input vector and corresponding request are classified as belonging to the audience, and vice versa).

Next, some embodiments may determine that some components of the audience membership vector function satisfy a respective threshold, as indicated by block 88. In some embodiments, each leaf node of a decision tree may include a confidence value, for example, indicating an amount of training error attributable to the respective leaf node.

Request vectors mapped to a given leaf node may be associated with these confidence values, and the confidence values may be compared to a threshold corresponding to the respective audience described by the respective audience membership function of the audience membership vector function.

Next, some embodiments may select content corresponding to the components of the audience membership vector function that satisfy the respective threshold, as indicated by block 90. Some embodiments may rank responsive audiences based on confidence values, or some audiences may be deemed more valuable than others and may be selected even with lower confidence values. In some embodiments, each audience may be associated with a valuation score, and confidence values may be multiplied by the valuation scores to produce a ranking value from which responsive audiences are selected. In some embodiments, content may be mapped to multiple audiences, and audience ranking values may be aggregated according to content (for example, as a weighted sum) and the content ranked according to content ranking values. In some cases, the highest ranking content may be selected. In some cases, selecting content includes selecting a value that corresponds to content in another system, e.g., reporting audience membership by which another system retrieves content corresponding to the audience.

Next, some embodiments may cause the selected content to be sent to the given device, as indicated by block 92. Causing the content to be sent may include retrieving the content from memory and transmitting the content, sending instructions for the user device to retrieve the content from a third-party content hosting service, or sending data by which a decision to purchase the right to serve the content is made. In some cases, causing the content to be sent may include sending information upon which a bid in an advertising auction is calculated, for example, a binary value indicating audience membership that causes an advertiser to submit a bid in response.

In some embodiments, to expedite processing, calculation of the audience membership vector components may be executed in parallel, with each dimension being executed, for example, in a different thread or different computing node. In some embodiments, the component calculations may be mapped to a plurality of different computing nodes, and values of the components may be reduced by other computing nodes by comparing confidence values to threshold values, as described above, for example, with a MapReduce algorithm.

In some embodiments content, such as advertisements, business listings, articles, and the like may be selected according to correspondence with the responsive audiences. In some embodiments, content targeters may identify content in advance as being targeted to particular audiences. For example, an advertiser may wish to send a particular advertisement to young suburbanite professionals who golf on the weekends and frequent a particular store. In some cases, a training data set may be identified by querying existing records for users who have exhibited this targeted behavior. That training set may then be input to the process of FIG. 2 to train a model that identifies other users likely to engage in the targeted behavior as well. Later, when a new request for content is received, that request may be input into the resulting model, and audience membership may be detected, thereby indicating to an advertiser that the corresponding advertisement should be sent, as the user is likely to engage in the targeted behavior.

In some cases, when the groups (e.g., audiences) defined with the techniques above receive content, it is desirable to measure the effectiveness of the content in driving certain behavior, in some cases comparing multiple instances of content to one another with multiple treatments and a control collection. For instance, it is frequently useful to measure the effectiveness of content in driving people to visit places of interest (i.e., specified geographic locations), like a retailer's stores in an advertising market, schools in a municipality, hospitals in a city, venues for exercising, etc. To this end, some embodiments may selectively provide content to a treatment collection of users, while withholding the content from a control collection of users, and measure the difference in an amount of visits to the places of interest.

For instance, some embodiments may determine a place visitation rate (PVR), like that described in U.S. patent application Ser. No. 13/769,736, titled "Apparatus and Method for Identifying and Employing Visitation Rates," filed 18 Feb. 2013, the contents of which are hereby incorporated by reference. In some embodiments, for the exposed collection, the PVR is the number of exposed individuals who appear in the destination(s) of interest after being exposed, divided by the total number of individuals exposed to the content, in some cases, subject to constraints on the window of time in which a conversion must take place. For the control collection in some embodiments, the PVR is the number of unexposed individuals who appear in the destination of interest, divided by the total number of unexposed individuals in a population. In some cases, the PVR may be determined on a region-by-region, and group (e.g., audience) by group, and content-treatment by content-treatment basis. (The term "rate" should not be read as limited to a temporal rate and can include a ratio of users.)

Some embodiments may undertake such measurements in a manner that addresses one or more problems presented by traditional geolocation data analytics systems. Many older systems combine the lift (e.g., difference in PVRs between control and treatment) due to behavioral targeting (e.g., via the audience selection techniques above) and the lift due to exposure to the content (and in some cases an interaction between those two effects). Some embodiments may provide a disaggregated view of these two lifts. Second, many older systems suffer from various biases. For example, individuals in audiences often have already appeared in network logs by which those audiences were defined, and as a result, it is expected that they are more likely to appear in the future. Also, due to real-world complexities in the execution of content targeting campaigns (e.g., budget constraints, market conditions for ad inventory, etc.), it is common to not be able to expose everyone in the treatment collection to the content. Transferring unexposed individuals from the treatment collection to the control collection at reporting time may bias upward the control PVR. Embodiments are not limited to systems that address every one of these deficiencies, though, as solutions that mitigate individual problems are independently useful and are contemplated by the inventors.

The computational challenges are best understood with an appreciation for the complexity and scale of content-efficacy measurements supported by some embodiments. Some embodiments measuring the efficacy of content in driving certain behavior, e.g., among a relatively large number of audiences (and permutations of those audiences for members in multiple audiences) (like more than five, and in many cases more than 20), among a relatively large number of geographic areas and durations of time into which the content is sent (e.g., more than five, and in many cases more than 20 areas, like zip codes, cities, or counties). Further, the observed behaviors may also be relatively granular and complex measurements, e.g., embodiments may infer visits to geofences associated with a relatively large number of stores for a given retailer or class of retailers carrying a certain brand, which may entail detecting and analyzing visits to by any one of more than 20, and in many cases, more than 100 different geographic locations (e.g., defined by regular tiles and in some cases by bounding polygons). Further complexity arises from the scale of the populations subjected to the analysis, e.g., more than 1,000, and in many cases, more than 10,000 or 100,000 user computing devices may be included in a population subject to the analysis. Challenges also arise from the nature of the observable data, as analyses are often based on logged network communications for mobile computing devices (like smart phones, tablets, wearable computers, etc.), and reported device identifiers often appear intermittently in such logs and in some cases can be changed periodically for a given device.

Given these challenges, traditional data analytics systems are not well suited for selecting and effectively managing a control collection that 1) reliably does not receive a treatment; and 2) is selected with fewer biases than arise with the more common, relatively naïve approaches for control group selection in other, simpler forms of AB testing in marketing and business intelligence.

For example, an individual x (or more precisely, a computing device identifier of the individual appearing in network logs) may belong to multiple audiences for which targeted content is being measured. In this case, if the procedure for forming a control collection is to simply hold out 100,000 individuals from a given audience (or intersection of audiences), it is possible for an individual to be in an unexposed group for that audience, but in an exposed group for another audience that is also part of the definition of which users-devices are to be targeted (as often arises when a targeted population is defined as the union of a large number of audiences). In this case, x is not an appropriate control subject for the first line item, at least in some embodiments (as some of the present techniques are independently useful and may also benefit simpler analysis).

An alternative, but still problematic, approach is a two-step technique. The technique begins by iterating through each group (e.g., audience or intersection or union of audiences) and randomly selecting a subset of individuals (or more precisely, computing device identifiers of the individuals appearing in network logs) to be members of a portion of a candidate control collection. Then, the portions of the candidate control collection may be joined, and members of the candidate control collection may be compared against the members of each group to remove any overlap, making it less likely that a control collection member is exposed to the treatment, essentially forcing an individual who is in any control collection to be in all control collections. The problem with this approach is that individuals who belong to multiple line items are more likely to be included in the control collections because they have multiple opportunities to be selected to be in them, which can give rise to a bias. If these individuals also have a higher probability of converting (because they belong to multiple line items), then the control collections are expected to have their PVRs biased upwards, and the treatment groups are expected have their PVRs biased downwards. (The description of this and the other "problems" of some approaches should not be construed as a disclaimer, as many of the present techniques are independently useful and benefit sub-optimal designs.)

Some embodiments may mitigate these and other challenges in generating simultaneous control collections for complex multi-audience tests.

In order to isolate (or reduce the interaction of) the effects of both the behavioral targeting and exposure to the content, some embodiments may distribute (or not distribute) content to, and collect data (e.g., later reported geolocations of) mobile user computing devices from, four collections:

a. (collection A) a receiver grouped-device collection that has user computing devices that are targeted (e.g., in virtue of being in one or more designated audiences) and are designated for exposure to the treatment (e.g., to receive the content);

b. (collection B) a receiver ungrouped-device collection that has user computing devices that are not targeted (e.g., are selected without regard to whether the devices belong to any particular audience) and are designated for exposure to the treatment;

c. (collection C) a reserve grouped-device collection that has user computing devices that are targeted (according to the same or similar criteria as is used to determine the receiver grouped-device collection) and are designated to not receive the treatment (e.g., to have the content withheld); and d. (collection D) a reserve ungrouped-device collection that has user computing devices that are not targeted and are designated to not receive the treatment.

Together, collections A and B constitute the receiver collections, collections B and C constitute the reserve collections, collections A and C constitute the grouped-device collections, and collections B and D constitute the ungrouped-device collections. To create the C collection, some embodiments may withhold device identifiers in the target group from exposure to the content, and to create the B collection, some embodiments may sample device identifiers (at random, e.g., pseudo-randomly) from network logs and expose those devices to the content.

With these collections, some embodiments may make a number of measurements:

a. determining lift due to exposure to the content among those in the target segments (e.g., by determining a difference between PVRs for the A collection and the C collection, i.e., a A vs. C PVR delta);

b. determining lift due to exposure to the content among those who are not targeted (e.g., by determining a difference between PVRs for the B collection and the D collection, i.e., a B vs. D PVR delta);

c. determining lift due to being in target segments among those exposed to the content (e.g., by determining a difference between PVRs for the A collection and the B collection);

d. determining lift for those not in the target segments among those exposed to the content (e.g., by determining a difference between PVRs for the C collection and the D collection);

e. determining an advantage targeted content distribution has over untargeted content distribution (e.g., arbitrarily distribution of advertising) (e.g., by determining a difference between the A vs. C PVR delta and the B vs. D PVR delta).

To generate the four groups, some embodiments may execute a sampling strategy in which: (1) the four groups are disjoint; and (2) device identifiers in exposed (or respectively, unexposed) groups remain in exposed (or respectively, unexposed) groups over time, notwithstanding intermittent appearance of device identifiers in network logs and audiences. Some embodiments may satisfy these criteria for all devices, or a sufficient amount of devices to yield usable results, e.g., permitting some relaxation depending on the statistical power of the measurement.

Consistency in exposure and treatment groups over time, in commercially relevant use cases, imposes significant computational complexity. The set of device identifiers in network logs and the groups (e.g., audiences) are expected to change intermittently. Ideally, the control collections reflect these changes, but this presents a challenge: If a device identifier x appears in an unexposed control collection of a targeted group in Week 1, disappears from the audience underlying that group in Week 2, but reappears in Week 3, ideally, at least some embodiments ensure that it is in an unexposed group in Week 3. This "chaining effect" or "path dependence," preferably, may be accounted for indefinitely (to the extent permitted by computing resources available) and may introduce various biases to the control groups.

To establish the various collections, some embodiments use hashing, instead of simple random sampling, as is more common in traditional techniques. Some embodiments hash each device identifier using a hash function selected for a propensity to produce pseudo-random results, such as a cryptographic hash function, like a provably secure cryptographic hash function. Some embodiments may input the device identifier into the md5 hash function, for instance, using the Python library hashlib, or other hash functions, like SHA-1, VSH, FSB, MuHASH, etc. For instance, the UDID "002ebf12-a125-5ddf-a739-67c3c5d20177," (expressed as a 40-character hex string), when input to the md5 hash function, yields a hash value of "9019be98c59e7438587168955b5f3662."

Then, some embodiments create the collections by interrogating pre-images of sets of hash values; e.g., the set of device identifiers that map to a particular set of hash values. Some embodiments may include additional device attributes in the hash input or use other device identifiers, either in the alternative or conjunctively, e.g., attributes of a user-agent string, other device identifiers, a device maker, a device model, an IP address, etc. In many use cases, it is expected that inputs that are consistent over time are to be preferred, though, to maintain consistency in collection assignments.

In some cases, ranges of hash values may be designated for each collection, and assignment or collection-look-up for a given device identifier may entail determining whether the hash function output based on the device identifier is greater than a minimum hash value for the range and less than a maximum hash value for the range. In some cases, the hash function has a fixed range of potential values that the hash function can output (e.g., 00000000000000000000000000000000 to ffffffffffffffffffffffffffffffff in hexadecimal), and the range is divided by a threshold, with values below the threshold indicating the device is in a control (i.e., reserve) collection and values above or equal to the threshold indicating the device is in treatment (i.e., receiver) collection that receives the content. In some cases, the hash values are mapped to collections in advance of calculating hash values on device identifiers. In some embodiments, the hash function is configured to output a binary value of 0 or 1, corresponding to false and true, and the result may be applied in an "if" statement, e.g., "if hash_function(device_ID):" then the device is in a control collection. Examples of such functions include a function that expresses an md5 hash_function output in binary form and outputs a least-significant digit of the binary result.

Thus, some embodiments may hold out a certain set of device identifiers taken from the target groups (e.g., audiences) so that those devices never (or are less likely to) get exposed to the treatment (e.g., a content-targeting-strategy pair) during a measurement. The device identifiers in the target groups are candidates for exposure. For instance, for a given group (e.g., audience) among a definition of a targeted population (that may have multiple groups), the (collection A) receiver grouped-device collection may be the set of device identifiers in that group that are not withheld, and (collection C) the reserve grouped-device collection may be the set of device identifiers withheld in virtue of their hash values falling into a set of control collection hash values Similarly, some embodiments take random (e.g., pseudo-random) subsets of device identifiers appearing in the network logs (which may or may not be in the targeted groups) and place them in the (collection B) receiver ungrouped-device collection and the (collection D) reserve ungrouped-device collection, so that they get exposed or held out, respectively. Of note, that this process can be used for relatively complex definitions of targeted populations without reducing the rigor or complicating the execution or interpretation of the measurement.

Because embodiments use hashing and because the four sets of hash values are disjoint, it follows that the four collections A-D are disjoint. Furthermore, as long as the hash value assignments and device identifiers remain the same over time, no device identifier appearing in an exposed group are not expected to appear in an unexposed group, and vice versa.

Of note, substituting cryptographic hash functions that generate pseudorandom outputs for random selection is expected to afford significant reduction in the computational complexity of selecting and managing the various collections, as sets of hash values can be mapped to each collection, expediting assignment and look-up operations. It should be noted, though, that embodiments are not limited to systems that provide this benefit, as various other inventions described herein are independently useful.

In some cases, the network logs are the raw network logs containing a relatively large number of transactions, each transaction corresponding to an exchange between a server and a remote user computing device. Some of each of the transactions may be associated with a device identifier, a time-stamp, and data indicative of a geolocation of user computing device communicating with the server. In some cases, the network logs are ad request logs, or in other cases, they are logs for a server receiving API request from a native mobile application or web requests from a web browser. In some cases, the network logs are extractions from raw network logs or impression counts data that is generated as intermediate output audience generation, or any number of other sources containing device identifiers associated with exchanges between user computing devices and remote servers.

Device identifiers may take a variety of forms, e.g., Unique Device Identifiers (UDIDs), Core Foundation Universally Unique Identifier (CFUUID), browser or device configuration fingerprints, advertising identifier, media access control (MAC address), etc. In some cases, the device identifiers may be obtained with the techniques described in U.S. Provisional Patent Application 62/244,767, titled "BRANCHING MOBILE-DEVICE TO SYSTEM-NAMESPACE IDENTIFIER MAPPINGS," filed 22 Oct. 2015 and U.S. patent application Ser. No. 14/334,066, titled "Matching Anonymized User Identifiers Across Differently Anonymized Data Sets," filed 17 Jul. 2014, both of which are incorporated by reference.

Some embodiments may execute the techniques for collection assignment and look-up in a way that is sensitive to the latency constraints that arise in content distribution and in particular in real-time bidding systems for online ad auctions. Content selection typically happens within less than 500 milliseconds of a request, and in most commercial use cases, within less than 100 milliseconds. Studies have shown that even an extra 200 milliseconds of latency can significantly affect user engagement and content effectiveness. To make the computer system more responsive, some embodiments may select control collections in a batch process run in advance of the determination of whether to respond with content to any particular request from a member of the population in a measurement. In some embodiments, at content-request time, collection assignments may be determined relatively quickly with a Bloom filter configured to determine whether a device identifier corresponds to a particular collection or union of collections.

The number of computing devices in and complexity of the selection process in typical use cases are such that some embodiments may employ techniques to render the batch process tractable with reasonable amounts of computing resources. Some embodiments may include a pipeline that generates groups of device identifiers that can be pieced together to run a measurement (e.g., a campaign) that has the relevant control collection for each group. In some cases, the process is executed as a MapReduce job, e.g., with the Hadoop framework, with different segments of the data being sent to different computing devices that concurrently perform portions of the analysis and return responses for aggregation.

Some embodiments may take as an input: (1) for each group, the list of device identifiers belonging to that group; and (2) a list of device identifiers appearing in network logs from which the test population is to be taken and corresponding to the same (or a similar) period that was used to generate the groups (e.g., the audiences described above).

In some cases, the process for assigning the devices to the various collections is based on a set of configuration parameters: (1) the set of hash values corresponding to each of the collections; and (2) parameters specifying the time period used for audience generation.

Some embodiments may execute two Hadoop jobs as part of the pipeline: (1) based on impression counts data, determine the untargeted (or un-grouped) collections for control and treatment (e.g., the devices outside of the union of the various audiences selected, appearing in the network logs from which the audiences were defined during the period from which the audiences were taken) based on hash sampling of hashes of devices identifiers; and (2) based on the groups targeted, use hash sampling to determine the targeted collections for control and treatment.

Figure 4:
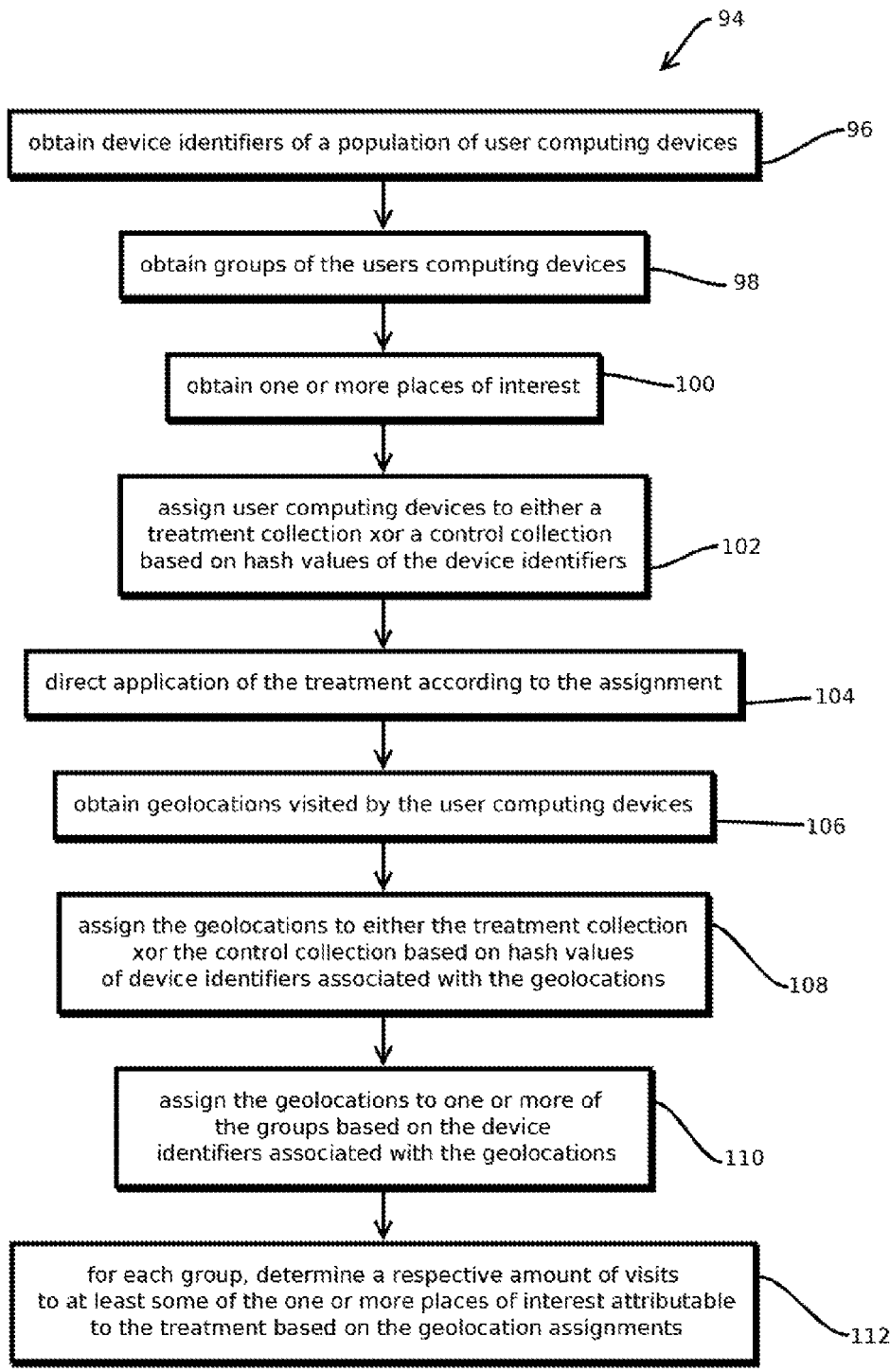
FIG. 4 shows an example of a process for performing geolocation data analytics on multi-group populations of user computing devices.

FIG. 4 illustrates a flow chart of a process 94 for collection assignment and content efficacy measurement. In some embodiments, the process 94 may be executed by the above-described visitation rate module 48 of the geolocation analytics platform 12 of FIG. 1, but embodiments are not limited to that computing environment.

In some embodiments, the process 94 includes obtaining device identifiers of a population of user computing devices, as indicated by block 96. In some cases, the population may be a population from which audiences are identified using the techniques described above, and in some cases, a targeted portion of the population may be defined by specifying a union of those audiences. In some cases, the population is identified from network logs like those described above, and in some cases, records in the network logs may include time-stamped records of communications between individual user computing devices and remote servers, in some cases, including geolocations of the user computing device at the time of the exchange and a device identifier of the user device. In some cases, the network logs come from a variety of different servers, for example, interacting with a variety of different user devices and providing a variety of different services or types of content. In some cases, the network logs are cellular network logs. In some cases, the network logs span some trailing duration of time, for example, a preceding week, a preceding month, a preceding six-month duration, or longer. In some cases, the population may be relatively large, for example, exceeding 1-million user computing devices, and in many cases exceeding 10-million user computing devices, for example, appearing among more than 50 million network log entries indicative of distinct communications over a network, like over the Internet.

Next, some embodiments may obtain groups of the user computing devices, as indicated by block 98. In some embodiments, this process may include executing the above-described processes to identify audiences and receiving a definition of a targeted population in terms of those audiences. For example, an analyst may specify that a targeted population is defined as users either in the intersection of audience A and audience B or in the union of audiences C and D.

Next, some embodiments may obtain one or more places of interest, as indicated by block 100. In some embodiments, the places of interest may be specified in terms of collections of tiles, and in some cases time tiles, for example, tiles overlaying each store location of a given advertiser, or tiles overlaying each geographic area in which a government entity wishes to measure a visitation rate result. In some embodiments, the places of interest are specified as polygons having vertices corresponding to the boundaries of such places. In some embodiments, the number of places of interest may be relatively large, for example, more than 50 places of interest appearing in a metropolitan area, a state, or a country.

Next, some embodiments may assign user computing devices to either a treatment collection or a control collection based on hash values of the device identifiers, as indicated by block 102. In some embodiments, the step may entail performing the techniques described above.

Next, some embodiments may direct application of the treatment according to the assignment, as indicated by block 104. In some cases, step 102 is performed as a batch process for each of the relatively large number of devices, and the results may be stored in a data structure amenable to relatively fast interrogation to determine whether a given device identifier corresponds to a particular collection. In some cases, application of the treatment may include sending content that is being tested to a user computing device. For example, a user may navigate to a particular website or interact with a native mobile application in such a manner that the user's computing device issues a network request for content (e.g., for an ad to be inserted into a publisher's website). In some embodiments, the request for content includes the device identifier and in some cases a timestamp and geolocation of the device.

In some embodiments, the request for content may be received by a third party system (like an ad network, or a bidder in an ad network), and that third-party system may submit a request to the system described with reference to FIG. 1 to determine whether to send the content being tested (such as an ad or instance of advocacy) in response, or if such content should be withheld because the device is in a control collection. In some cases, directing application of the treatment entails making this determination on behalf of another system that then actually sends the content, without actually sending the content with the system that directs application of the treatment. In some cases, this determination is made relatively quickly, for example, subject to the latency constraints described above. In some embodiments, the treatment may be a selection among a set of instances of content, such as among a set of candidate ads being tested, or the treatment may be a single instance of content that is being tested. In some embodiments, step 104 may be ongoing for some duration of time, like a week, a month, or a longer, as an instance of content is tested.

Next, some embodiments may obtain geolocations visited by the user computing device, as indicated by block 106. In some cases, this step may include performance of the techniques described above with reference to block 48 of FIG. 1, including the techniques incorporated by reference. In some cases, the obtained geolocations are obtained from the user computing device, such as a mobile computing device, being carried into a particular store or other place of interest by a user, and the user interacting with the computing device such that the user computing device is caused to issue a request for content, like those described above, including a geolocation and device identifier. In some embodiments, the obtained geolocations may be obtained from an updated network log, which may be the same network log described above or may be a different network log. In some cases, the updated network log spans the duration of time over which step 104 is performed.

In some cases, the geolocations are reported as places visited, or some embodiments may compare the geolocations to the list of places of interest to determine whether the geolocations correspond to visit. In some cases, the geolocations are aggregated as visits, or reported as places visited, where a place visited corresponds to a region in which the user remained within some area for some threshold duration of time. Some embodiments may advance just the visits to subsequent steps.

Next, some embodiments may assign the geolocations to either the treatment collection or the control collection based on hash values of device identifiers associated with those geolocations, as indicated by block 108. In some cases, the step may include determining whether devices engaging in network communications referencing those geolocations have device identifiers belonging in one of these collections. Some embodiments may assign a subset of the geolocations to the various collections by first filtering from the obtain geolocations those that correspond to, e.g., are within, one of the places of interest. For example, some embodiments may determine visits to the places of interest appearing within the obtain geolocations and, then, assign those visits to either the treatment collection or the control collection as indicated. Some embodiments may determine unique visits by maintaining a count of the number of times each device identifier is determined to have visited a one of the places of interest, or any of the places of interest, or both, and reporting a count of those devices with a count greater than or equal to one.

Next, some embodiments may assign the geolocations to one or more of the groups (including the non-targeted portion of the population) based on the device identifiers associated with the geolocations. In some cases, each of the groups may be defined, at least in part, by a set of device identifiers appearing within the respective group, and some embodiments may query each group definition with each device identifier to determine whether the device identifier corresponds to the respective group. Again, the assignment of geolocations may include first filtering geolocations that do not pertain to one or more the places of interest or expressing the geolocations as visits to one of the places of interest and assigning the visits to the groups. In some cases, this step may include calculating a respective place visitation rate for the control and treatment portion of each group.

Next, for each group, some embodiments may determine a respective amount of visits to at least some of the one or more places of interest attributable to the treatment based on the geolocation assignments, as indicated by block 112. In some cases, this step may include making one or more of the lift determinations described above. In some embodiments, results may be reported, for example, as a table to be displayed on an analyst screen, indicating lift due to exposure to the content among those in target segments, lift due to exposure to the content among those who are not targeted, lift due to being in a target segment among those exposed content, lift for those not in the target segments among those exposed to the content, and a measure of an advantage targeted content distribution has over untargeted content distribution.

Figure 5:
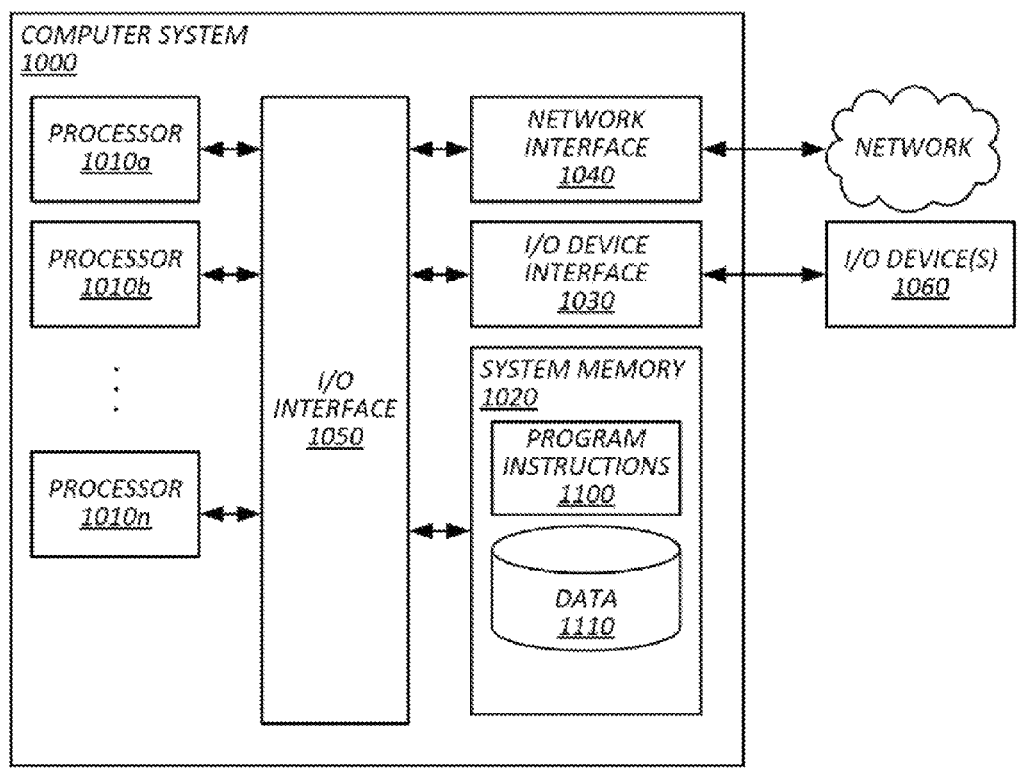
FIG. 5 shows an example of a computing device by which the above systems may be implemented.

FIG. 5 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise (e.g., by referring to an exclusive or with "xor"), non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs.

What is claimed is:

1. A method comprising:
    obtaining, with one or more computer processors, one or more network traffic logs documenting communications via a network between one or more servers and more than 10,000 user computing devices, wherein at least some of the communications are associated with a respective timestamp and a device identifier of a respective user computing device among the more than 10,000 user computing devices;
    defining for at least some user computing devices identified in the one or more network traffic logs, with one or more computer processors, a plurality of device groups, each device group being defined, at least in part, as a consequence of a subset of the user computing devices sharing a respective attribute, each subset having a plurality of user computing devices, each device group being defined by at least one different attribute from the other device groups, at least a plurality of the user computing devices being un-grouped devices that are not in one of plurality of device groups, wherein at least some of the user computing devices appear in multiple device groups;
    for each device group among the plurality of device groups, selecting, with one or more computer processors, from the respective device group:
        a receiver grouped-device collection to receive a network communication of one or more content items, the receiver grouped-device collection having a plurality of the user computing devices; and
        a reserve grouped-device collection to not receive a network communication of the one or more content items, the reserve grouped-device collection having a plurality of the user computing devices;
    selecting, with one or more computer processors, from the un-grouped devices:
        a receiver ungrouped-device collection to receive a network communication of the one or more content items, the receiver ungrouped-device collection having a plurality of the user computing devices; and
        a reserve ungrouped-device collection to not receive a network communication of the one or more content items, the reserve ungrouped-device collection having a plurality of the user computing devices;
    receiving, with one or more computer processors, indications of a network requests for content from more than 1,000 of the user computing devices and, within less than 500 milliseconds of receiving the indication, for each of the indications, determining:
        to send at least some of the one or more content items to the respective user computing device issuing a request causing the respective indication in response to the respective user computing device being in either the receiver grouped-device collection or receiver ungrouped-device collection; xor
        to not send any of the one or more content items to the respective user computing device issuing a request causing the respective indication in response to the respective user computing device being in either the reserve grouped-device collection or the reserve ungrouped-device collection;
    storing a result of the determinations in memory;
    sending, with one or more computer processors, signals that effectuate the determinations;
    obtaining one or more geolocations to be measured for user visits;
    obtaining one or more updated network traffic logs after sending at least some of the signals that effectuate the determinations, the updated network traffic logs including device identifiers of at least some of the more than 10,000 user computing devices and geolocations from which the at least some of the more than 10,000 user computing devices communicated;
    determining visit amounts at the one or more geolocations to be measured for a plurality of the device groups based on geolocations in the one or more updated network traffic logs; and
    storing the determined visit amounts in memory.

2. The method of claim 1, wherein:
    the one or more updated network traffic logs comprise timestamps at which the at least some of the more than 10,000 user computing devices communicated;
    determining visit amounts at the one or more geolocations for a plurality of the device groups comprises:
        determining a reserve grouped-device visit amount by, at least in part, for a given reserve grouped-device collection, counting a number of user computing devices that are:
            associated with a geolocation in the updated network log that indicates the respective user computing device communicated from at least one of the one or more geolocations to be measured; and
            associated with a device identifier in the updated network log that indicates the respective user computing device is among the given reserve grouped-device collection;
        determining a reserve ungrouped-device visit amount by, at least in part, for a given reserve ungrouped-device collection, counting a number of user computing devices that are:
            associated with a geolocation in the updated network log that indicates the respective user computing device communicated from at least one of the one or more geolocations to be measured; and
            associated with a device identifier in the updated network log that indicates the respective user computing device is among the reserve ungrouped-device collection;
        determining a receiver grouped-device visit amount by, at least in part, for a given receiver grouped-device collection, counting a number of user computing devices that are:
            associated with a geolocation in the updated network log that indicates the respective user computing device communicated from at least one of the one or more geolocations to be measured; and
            associated with a device identifier in the updated network log that indicates the respective user computing device is among the given receiver grouped-device collection; and
        determining a receiver ungrouped-device visit amount by, at least in part, for a given receiver ungrouped-device collection, counting a number of user computing devices that are:
            associated with a geolocation in the updated network log that indicates the respective user computing device communicated from at least one of the one or more geolocations to be measured; and associated with a device identifier in the updated network log that indicates the respective user computing device is among the receiver ungrouped-device collection.

3. The method of claim 2, comprising:

determining an effect attributable to an attribute of the device group of the given receiver grouped-device collection and the given reserve grouped-device collection based on a difference between the reserve grouped-device visit amount and the reserve ungrouped-device visit amount.

4. The method of claim 2, comprising:

determining an effect attributable to sending at least some of the one or more content items based on a difference between the receiver grouped-device visit amount and the receiver ungrouped-device visit amount.

5. The method of claim 2, comprising:

determining visit amounts for more than five groups for more than ten geolocations; and comparing effects attributable to attributes of the groups and effects attributable to sending at least some of the one or more content items among at least a plurality of the more than five geolocations.

6. The method of claim 1, wherein selecting from the respective device group comprises:

designating a first set of hash values for the reserve collections;

designating a second set of hash values for the receiver collections;

for a first user computing device among the more than 10,000 user computing devices, determining a first hash value based on an identifier of the first user computing device;

in response to determining that the first hash value is in the first set of hash values, designating the first user computing device as a member of one or more of the reserve collections;

for a second user computing device among the more than 10,000 user computing devices, determining a second hash value based on an identifier of the second user computing device; and in response to determining that the second hash value is in the second set of hash values, designating the second user computing device as a member of one or more of the receiver collections.

7. The method of claim 6, wherein:

designating a first set of hash values for the reserve collections is performed before determining that the first hash value is in the first set of hash values.

8. The method of claim 1, wherein selecting from the un-grouped devices comprises:

creating the ungrouped-device collections according to hash values of device identifiers of the un-grouped devices.

9. The method of claim 1, wherein the receiver collections and the reserve collections are disjoint with respect to one another.

10. The method of claim 1, wherein:

selecting from the respective device group comprises performing steps for defining reserve and receiver collections; and selecting from the un-grouped devices comprises performing steps for defining reserve and receiver collections.

11. A system comprising:

one or more processors; and memory storing instructions that when executed by at least some of the processors effectuate operations comprising:

obtaining, with one or more computer processors, one or more network traffic logs documenting communications via a network between one or more servers and more than 10,000 user computing devices, wherein at least some of the communications are associated with a respective timestamp and an device identifier of a respective user computing device among the more than 10,000 user computing devices;

defining, with one or more computer processors, a plurality of device groups, each device group being defined, at least in part, as a consequence of a subset of the user computing devices sharing a respective attribute, each subset having a plurality of user computing devices, each device group being defined by at least one different attribute from the other device groups, at least a plurality of the user computing devices being un-grouped devices that are not in one of plurality of device groups, wherein at least some of the user computing devices appear in multiple device groups;

for each device group among the plurality of device groups, selecting, with one or more computer processors, from the respective device group:

a receiver grouped-device collection to receive a network communication of one or more content items, the receiver grouped-device collection having a plurality of the user computing devices; and a reserve grouped-device collection to not receive a network communication of the one or more content items, the reserve grouped-device collection having a plurality of the user computing devices;

selecting, with one or more computer processors, from the un-grouped devices:

a receiver ungrouped-device collection to receive a network communication of the one or more content items, the receiver ungrouped-device collection having a plurality of the user computing devices; and a reserve ungrouped-device collection to not receive a network communication of the one or more content items, the reserve ungrouped-device collection having a plurality of the user computing devices;

receiving, with one or more computer processors, indications of a network requests for content from more than 1,000 of the user computing devices and, within less than 500 milliseconds of receiving the indication, for each of the indications, determining:

to send at least some of the one or more content items to the respective user computing device issuing a request causing the respective indication in response to the respective user computing device being in either the receiver grouped-device collection or receiver ungrouped-device collection; xor to not send any of the one or more content items to the respective user computing device issuing a request causing the respective indication in response to the respective user computing device being in either the reserve grouped-device collection or the reserve ungrouped-device collection;

storing a result of the determinations in memory;
sending, with one or more computer processors, signals that effectuate the determinations
obtaining one or more geolocations to be measured for user visits;
obtaining one or more updated network traffic logs after sending at least some of the signals that effectuate the determinations, the updated network traffic logs including device identifiers of at least some of the more than 10,000 user computing devices and geolocations from which the at least some of the more than 10,000 user computing devices communicated;
determining visit amounts at the one or more geolocations to be measured for a plurality of the device groups based on geolocations in the one or more updated network traffic logs; and
storing the determined visit amounts in memory.

12. The system of claim 11, wherein:
the one or more updated network traffic logs comprise timestamps at which the at least some of the more than 10,000 user computing devices communicated;
determining visit amounts at the one or more geolocations for a plurality of the device groups comprises:
  determining a reserve grouped-device visit amount by, at least in part, for a given reserve grouped-device collection, counting a number of user computing devices that are:
    associated with a geolocation in the updated network log that indicates the respective user computing device communicated from at least one of the one or more geolocations to be measured; and
    associated with a device identifier in the updated network log that indicates the respective user computing device is among the given reserve grouped-device collection;
  determining a reserve ungrouped-device visit amount by, at least in part, for a given reserve ungrouped-device collection, counting a number of user computing devices that are:
    associated with a geolocation in the updated network log that indicates the respective user computing device communicated from at least one of the one or more geolocations to be measured; and
    associated with a device identifier in the updated network log that indicates the respective user computing device is among the reserve ungrouped-device collection;
  determining a receiver grouped-device visit amount by, at least in part, for a given receiver grouped-device collection, counting a number of user computing devices that are:
    associated with a geolocation in the updated network log that indicates the respective user computing device communicated from at least one of the one or more geolocations to be measured; and
    associated with a device identifier in the updated network log that indicates the respective user computing device is among the given receiver grouped-device collection; and
  determining a receiver ungrouped-device visit amount by, at least in part, for a given receiver ungrouped-device collection, counting a number of user computing devices that are:
    associated with a geolocation in the updated network log that indicates the respective user computing device communicated from at least one of the one or more geolocations to be measured; and
    associated with a device identifier in the updated network log that indicates the respective user computing device is among the receiver ungrouped-device collection.

13. The system of claim 12, the operations comprising:
determining an effect attributable to an attribute of the device group of the given receiver grouped-device collection and the given reserve grouped-device collection based on a difference between the reserve grouped-device visit amount and the reserve ungrouped-device visit amount.

14. The system of claim 12, the operations comprising:
determining an effect attributable to sending at least some of the one or more content items based on a difference between the receiver grouped-device visit amount and the receiver ungrouped-device visit amount.

15. The system of claim 12, the operations comprising:
determining visit amounts for more than five groups for more than ten geolocations; and
comparing effects attributable to attributes of the groups and effects attributable to sending at least some of the one or more content items among at least a plurality of the more than five geolocations.

16. The system of claim 11, wherein selecting from the respective device group comprises:
designating a first set of hash values for the reserve collections;
designating a second set of hash values for the receiver collections;
for a first user computing device among the more than 10,000 user computing devices, determining a first hash value based on an identifier of the first user computing device;
in response to determining that the first hash value is in the first set of hash values, designating the first user computing device as a member of one or more of the reserve collections;
for a second user computing device among the more than 10,000 user computing devices, determining a second hash value based on an identifier of the second user computing device; and
in response to determining that the second hash value is in the second set of hash values, designating the second user computing device as a member of one or more of the receiver collections.

17. The system of claim 16, wherein:
designating a first set of hash values for the reserve collections is performed before determining that the first hash value is in the first set of hash values.

18. The system of claim 11, wherein selecting from the un-grouped devices comprises:
creating the ungrouped-device collections according to hash values of device identifiers of the un-grouped devices.

19. The system of claim 11, wherein the receiver collections and the reserve collections are disjoint with respect to one another.

20. The system of claim 11, wherein:
selecting from the respective device group comprises performing steps for defining reserve and receiver collections; and
selecting from the un-grouped devices comprises performing steps for defining reserve and receiver collections.

* * * * *